(12) United States Patent
Xue et al.

(10) Patent No.: US 11,856,393 B2
(45) Date of Patent: Dec. 26, 2023

(54) POWER CONTROL METHOD AND POWER CONTROL APPARATUS

(71) Applicant: Huawei Technologies Co., Ltd., Shenzhen (CN)

(72) Inventors: Yifan Xue, Beijing (CN); Jian Wang, Beijing (CN); Xingwei Zhang, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 17/421,869

(22) PCT Filed: Jan. 13, 2020

(86) PCT No.: PCT/CN2020/071813
§ 371 (c)(1),
(2) Date: Jul. 9, 2021

(87) PCT Pub. No.: WO2020/143835
PCT Pub. Date: Jul. 16, 2020

(65) Prior Publication Data
US 2022/0078721 A1    Mar. 10, 2022

(30) Foreign Application Priority Data
Jan. 11, 2019  (CN) .......................... 201910030629.3

(51) Int. Cl.
*H04W 52/24*    (2009.01)
*H04W 76/23*    (2018.01)
(Continued)

(52) U.S. Cl.
CPC ......... *H04W 52/242* (2013.01); *H04L 5/0035* (2013.01); *H04W 52/146* (2013.01); *H04W 52/383* (2013.01); *H04W 76/23* (2018.02)

(58) Field of Classification Search
CPC .................................................. H04W 52/242
See application file for complete search history.

(56) References Cited

U.S. PATENT DOCUMENTS 9,549,411 B2    1/2017  Miao
9,661,586 B2    5/2017  Gao et al.
(Continued)

FOREIGN PATENT DOCUMENTS

CN    103139889 A    6/2013
CN    104105181 A    10/2014
(Continued)

OTHER PUBLICATIONS

"Discussion on Sidelink Power Control," Source: Nokia, Nokia Shanghai Bell, Agenda Item: 5.2.9.2.3.3, Document for: Discussion and Decision, 3GPP TSG-RAN WG1 Meeting #90, R1-1714002, Prague, Czech Republic, Aug. 21-25, 2017, 3 pages.
(Continued)

*Primary Examiner* — Hsinchun Liao
(74) *Attorney, Agent, or Firm* — SLATER MATSIL, LLP

(57) ABSTRACT

A power control method and a power control apparatus, the method including determining a path loss estimate between a first terminal device and the second terminal device, determining a transmit power of a signal based on the path loss estimate between the first terminal device and the second terminal device and further based on a path loss estimate between a network device and the second terminal device, and sending, by the second terminal device, the signal to the first terminal device based on the transmit power of the signal. The signal is a physical sidelink shared channel (PSSCH), and the transmit power of the PSSCH is determined according to at least a maximum transmit power of the PSSCH, a target receive power of the PSSCH, the path loss estimate between the first terminal device and the
(Continued)

second terminal device, and a target receive power of the PSSCH.

20 Claims, 7 Drawing Sheets

(51) Int. Cl.
    *H04L 5/00*              (2006.01)
    *H04W 52/14*          (2009.01)
    *H04W 52/38*          (2009.01)

(56) References Cited

U.S. PATENT DOCUMENTS

| | | | |
|---|---|---|---|
| 9,961,487 | B1 | 5/2018 | Miao |
| 10,009,859 | B2 | 6/2018 | Wang |
| 10,080,251 | B2 | 9/2018 | Chen |
| 10,206,215 | B2 | 2/2019 | Kim et al. |
| 10,455,513 | B2 | 10/2019 | Wang et al. |
| 10,477,556 | B2 | 11/2019 | Aiba et al. |
| 10,716,155 | B2 | 7/2020 | Saiwai et al. |
| 10,813,059 | B2 | 10/2020 | Wang et al. |
| 2014/0274196 | A1 | 9/2014 | Dai et al. |
| 2015/0156728 | A1 | 6/2015 | Kwon et al. |
| 2015/0327188 | A1* | 11/2015 | Bagheri ............... H04W 76/10 455/552.1 |
| 2016/0150484 | A1 | 5/2016 | Seo et al. |
| 2017/0208476 | A1* | 7/2017 | Khambekar .......... H04W 16/14 |
| 2018/0213490 | A1 | 7/2018 | Bagheri et al. |
| 2018/0249429 | A1* | 8/2018 | Zhang ................ H04W 52/247 |

FOREIGN PATENT DOCUMENTS

| | | |
|---|---|---|
| CN | 104488332 A | 4/2015 |
| CN | 106375930 A | 2/2017 |
| CN | 106471853 A | 3/2017 |
| CN | 107018564 A | 8/2017 |
| CN | 107040865 A | 8/2017 |
| CN | 107211291 A | 9/2017 |
| CN | 108289324 A | 7/2018 |
| CN | 108702244 A | 10/2018 |
| EP | 3890410 A1 | 10/2021 |
| JP | 2017538352 A | 12/2017 |
| KR | 20160108393 A | 9/2016 |
| WO | 2016047753 A1 | 3/2013 |
| WO | 2016085624 A1 | 6/2016 |
| WO | 2017138378 A1 | 8/2017 |
| WO | 2018027993 A1 | 2/2018 |

OTHER PUBLICATIONS

"Sidelink Physical Layer Procedure," Agenda Item: 7.2.4.1.2, Document for: Discussion and Decision, Source: NTT DOCOMO, Inc., 3GPP TSG RAN WG1 Meeting #95, R1-1813318, Spokane, USA, Nov. 12-16, 2018, 5 pages.

"3rd Generation Partnership Project; Technical Specification Group Radio Access Network; NR; User Equipment (UE) Radio Transmission and Reception; Part 1: Range 1 Standalone (Release 15)," 3GPP TS 38.101-1, V15.3.0, Sep. 2018, 219 pages.

"3rd Generation Partnership Project; Technical Specification Group Radio Access Network; NR; Physical Layer Procedures for Control (Release 15)," 3GPP TS 38.213, V15.3.0, Sep. 2018, 101 pages.

"3rd Generation Partnership Project; Technical Specification Group Radio Access Network; NR; Physical layer procedures for data (Release 15)," 3GPP TS 38.214, V15.3.0, Sep. 2018, 96 pages.

"3rd Generation Partnership Project; Technical Specification Group Radio Access Network; NR; Physical layer measurements (Release 15)," 3GPP TS 38.215 V15.3.0, Sep. 2018, 15 pages.

"3rd Generation Partnership Project; Technical Specification Group Radio Access Network; NR; Radio Resource Control (RRC) protocol specification (Release 15)," 3GPP TS 38.331 V15.3.0, Sep. 2018, 445 pages.

"Sidelink Physical Layer Procedures for NR V2X," Agenda Item: 7.2.4.1.2, Source: Huawei, HiSilicon, Document for: Discussion and Decision, 3GPP TSG RAN WG1 Meeting #95, R1-1812205, Spokane, USA, Nov. 12-16, 2018, 12 pages.

"Physical Layer Procedure for NR Sidelink," Source: vivo, Agenda Item: 7.2.4.1.2, Document for: Discussion and Decision, 3GPP TSG RAN WG1 Meeting #95, R1-1812307, Spokane, USA, Nov. 12-16, 2018, 8 pages.

"Physical Layer Procedures for NR V2X Sidelink Communication," Source:Intel CorporationAgenda item: 7.2.4.1.2, Document for: Discussion and Decision, 3GPP TSG RAN WG1 Meeting #95, R1-1812489, Spokane, USA, Nov. 12-16, 2018,12 pages.

"Physical layer procedures for NR V2X," Agenda Item: 7.2.4.1.2, Source: NEC, Document for: Discussion/Decision, 3GPP TSG RAN WG1 Meeting #95, R1-1812649, Spokane, USA, Nov. 12-16, 2018, 5 pages.

"Support of Unicast, Groupcast and Broadcast in NR V2X," Source: ZTE, Sanechips, Agenta item: 7.2.4.1.2, Document for: Discussion and Decision, 3GPP TSG RAN WG1 Meeting #95, R1-1812730, Spokane, USA, Nov. 12-16, 2018, 6 pages.

"Discussion on Physical Layer Procedure for NR V2X," Document for: Discussion and decision, Agenda Item: 7.2.4.1.2, Source: Source: LG Electronics, 3GPP TSG RAN WG1 Meeting #95, R1-1812842, Spokane, USA, Nov. 12-16, 2018, 6 pages.

"Discussion on Physical Layer Procedures," Document for: Discussion and Decision, Agenda item: 7.2.4.1.2, Source: Samsung, 3GPP TSG RAN WG1 Meeting #95, R1-1812985, Spokane, USA, Nov. 12-16, 2018, 6 pages.

"Consideration oh Physical Layer Procedures," Document for: Discussion and decision, Agenda Item: 7.2.4.1.2, Source: Spreadtrum Communications, 3GPP TSG RAN WG1 Meeting #95, R1-1813075, Spokane, USA, Nov. 12-16, 2018,5 pages.

"On Physical Layer Procedures," Document for: Discussion and Decision, Agenda Item: 7.2.4.1.2, Source: InterDigital Inc., 3GPP TSG RAN WG1 Meeting #95, R1-1813227, Spokane, USA, Nov. 12-16, 2018, 5 pages.

"On Sidelink Physical Layer Procedures," Agenda item: 7.2.4.1.2, Document for: Discussion and Decision, Source: Nokia, Nokia Shanghai Bell, 3GPP TSG RAN WG1 Meeting #95, R1-1813520, Spokane, USA, Nov. 12-16, 2018, 6 pages.

"Oh PHY Procedures to Support Unicast and Groupcast on NR Sidelink," Document for: Discussion, Decision, Agenda Item: 7.2.4.1.2, Source: Ericsson, 3GPP TSG-RAN WG1 Meeting #95, R1-1813639, Spokane, WA, US, Nov. 12-16, 2018, 7 pages.

* cited by examiner

POWER CONTROL METHOD AND POWER CONTROL APPARATUS

CROSS REFERENCE TO RELATED APPLICATIONS

This application is a National Stage of International Application No. PCT/CN2020/071813, filed on Jan. 13, 2020, which claims priority to Chinese Patent Application No. 201910030629.3, filed on Jan. 11, 2019. Both of the aforementioned applications are hereby incorporated by reference in their entireties.

TECHNICAL FIELD

This application relates to the field of communications technologies, and in particular, to a power control method and a power control apparatus.

BACKGROUND

With evolution of communications technologies, the internet of everything also continuously accelerates. Internet of everything technologies not only include a narrowband internet of things (narrow band internet of things, NB-LOT) technology and an enhanced machine type communication (enhanced machine type communication, eMTC) technology, but also may include a thing-to-thing technology, a device-to-device (device to device, D2D) technology, and the like.

For the D2D technology, data may be directly sent between two terminal devices, that is, the data does not need to be first sent to a base station and then forwarded through a core network, so that a data latency can be greatly reduced. In other words, in the foregoing thing-to-thing sidelink (sidelink) transmission, the terminal devices communicate with each other. Specifically, in LTE D2D, when terminal devices communicate with each other, a transmitting end transmits a signal at a maximum transmit power, to ensure transmission reliability.

However, a main service type in LTE D2D is message broadcasting, but unicast or multicast service transmission needs to be introduced in new radio (new radio, NR) D2D. Therefore, how to control a power in NR D2D is a problem that is being studied by a person skilled in the art.

SUMMARY

This application provides a power control method and a power control apparatus, to properly control a power.

According to a first aspect, an embodiment of this application provides a power control method, including: A first terminal device determines a transmit power of a first signal based on a first value, where the first value is a value in a reference value set, the reference value set includes at least two power values, the first value does not exceed a first power, and the first power is determined based on a maximum transmit power of the first signal; the first terminal device sends indication information to a second terminal device, where the indication information is used to indicate or includes the first value; and the first terminal device sends the first signal to the second terminal device based on the transmit power of the first signal.

In this embodiment of this application, the first terminal device indicates the first value to the second terminal device, so that the second terminal device can obtain a path loss estimate between the first terminal device and the second terminal device based on the first value. Therefore, the second terminal device can effectively determine a transmit power of a signal (for example, a second signal) during sidelink transmission. This improves reliability of signal transmission between terminal devices.

With reference to the first aspect, in a possible implementation, the first value does not exceed a second power, and the second power is determined based on a path loss estimate between a network device and the first terminal device.

In this embodiment of this application, the first value is determined based on the path loss estimate between the network device and the first terminal device, so that interference caused by an excessively high transmit power of the first signal to an uplink signal sent by another terminal device to the network device can be avoided. This ensures reliability of transmission between terminal devices.

With reference to any one of the first aspect or the possible implementations of the first aspect, the reference value set is configured by the network device; the reference value set is predefined; or the reference value set is determined by a higher layer of the first terminal device.

With reference to any one of the first aspect or the possible implementations of the first aspect, the first value is used to indicate a transmit power on a first orthogonal frequency division multiplexing OFDM symbol on which the first signal is located; the first value is used to indicate a transmit power on a first resource element RE of a first OFDM symbol on which the first signal is located; or the first value is used to indicate a transmit power on a first resource block RB of a first OFDM symbol on which the first signal is located.

With reference to any one of the first aspect or the possible implementations of the first aspect, the transmit power of the first signal is a power value corresponding to the first value; or the transmit power of the first signal is a sum of a power value corresponding to the first value and a power offset value.

With reference to any one of the first aspect or the possible implementations of the first aspect, the power offset value is predefined, or the power offset value is determined by the first terminal device.

With reference to any one of the first aspect or the possible implementations of the first aspect, the first signal includes a sidelink synchronization signal block SSSB, the SSSB includes a physical sidelink broadcast channel PSBCH, a primary sidelink synchronization signal PSSS, and a secondary sidelink synchronization signal SSSS, and the indication information includes at least one of the following: load information of the PSBCH; a demodulation reference signal DMRS sequence of the PSBCH; and a power difference between at least two of the PSBCH, the PSSS, and the SSSS.

With reference to any one of the first aspect or the possible implementations of the first aspect, when the indication information includes the power difference between the at least two of the PSBCH, the PSSS, and the SSSS, there is a mapping relationship between the first value and the power difference, where the mapping relationship is configured by the network device; the mapping relationship is predefined; or the mapping relationship is determined by the higher layer of the first terminal device.

With reference to any one of the first aspect or the possible implementations of the first aspect, the first signal includes a physical sidelink shared channel PSSCH, and the indication information is carried in the PSSCH; the first signal includes a physical sidelink control channel PSCCH, and the indication information is carried in the PSCCH; or the first signal includes a physical sidelink feedback channel PSFCH, and the indication information is carried in the PSFCH.

With reference to any one of the first aspect or the possible implementations of the first aspect, the first signal includes a reference signal, the indication information includes a sequence of the reference signal, and the reference signal is used to determine channel state information between the first terminal device and the second terminal device.

With reference to any one of the first aspect or the possible implementations of the first aspect, after the first terminal device sends the first signal to the second terminal device based on the transmit power of the first signal, the method further includes: The first terminal device receives a second signal from the second terminal device, where a transmit power of the second signal is determined based on a path loss estimate between the first terminal device and the second terminal device, and the path loss estimate between the first terminal device and the second terminal device is determined based on the transmit power of the first signal and a receive power of the first signal.

With reference to any one of the first aspect or the possible implementations of the first aspect, the transmit power of the second signal satisfies the following formula:

$$P_2 = \min\{P_{CMAX\_2}, y(M) + P_{O\_1} + \alpha_1 \cdot PL_{SL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

It may be understood that $y(M)$ may be alternatively understood as an expression, a relational expression, or the like of the bandwidth of the second signal. This is not limited in this embodiment of this application.

With reference to any one of the first aspect or the possible implementations of the first aspect, the transmit power of the second signal is determined based on the path loss estimate between the first terminal device and the second terminal device and a path loss estimate between the network device and the second terminal device.

With reference to any one of the first aspect or the possible implementations of the first aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

With reference to any one of the first aspect or the possible implementations of the first aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

According to a second aspect, an embodiment of this application further provides a power control method, including: A second terminal device receives a first signal and indication information from a first terminal device, where the indication information is used to indicate or includes a first value, the first value is a value in a reference value set, the reference value set includes at least two power values, the first value does not exceed a first power, and the first power is determined based on a maximum transmit power of the first signal; and the second terminal device determines a path loss estimate between the first terminal device and the second terminal device based on the indication information and a receive power of the first signal.

In this embodiment of this application, the second terminal device can effectively determine the path loss estimate between the first terminal device and the second terminal device based on the indication information sent by the first terminal device and the receive power of the first signal, so that the second terminal device can send another signal (for example, a second signal) based on the path loss estimate between the first terminal device and the second terminal device. This avoids a case in which the second terminal device cannot effectively determine a transmit power of the another signal because the second terminal device cannot learn of the path loss estimate between the first terminal device and the second terminal device. In other words, reliability of signal transmission between terminal devices is improved.

With reference to the second aspect, in a possible implementation, the first value does not exceed a second power, and the second power is determined based on a path loss estimate between a network device and the first terminal device.

With reference to any one of the second aspect or the possible implementations of the second aspect, after the second terminal device determines the path loss estimate between the first terminal device and the second terminal device based on the indication information and the receive power of the first signal, the method further includes: The second terminal device determines a transmit power of a second signal based on the path loss estimate between the first terminal device and the second terminal device; and the second terminal device sends the second signal to the first terminal device based on the transmit power of the second signal.

With reference to any one of the second aspect or the possible implementations of the second aspect, the transmit power of the second signal satisfies the following formula:

$$P_2 = \min\{P_{CMAX\_2}, y(M) + P_{O\_1} + \alpha_1 \cdot PL_{SL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

With reference to any one of the second aspect or the possible implementations of the second aspect, that the second terminal device determines the transmit power of the second signal based on the path loss estimate between the first terminal device and the second terminal device includes: The second terminal device determines the transmit power of the second signal based on the path loss estimate between the first terminal device and the second terminal device and a path loss estimate between the network device and the second terminal device.

With reference to any one of the second aspect or the possible implementations of the second aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

With reference to any one of the second aspect or the possible implementations of the second aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

With reference to any one of the second aspect or the possible implementations of the second aspect, the first terminal device includes a terminal device in a terminal device set, where a path loss estimate between the terminal device and the second terminal device is the largest.

With reference to any one of the second aspect or the possible implementations of the second aspect, the terminal device set is a set of terminal devices that each establish a connection to the second terminal device, or the terminal device set is a set of terminal devices that each establish a connection to the second terminal device and whose distances from the second terminal device are within a reference range.

According to a third aspect, an embodiment of this application provides a power control apparatus. The power control apparatus may be used as a first terminal device, and the first terminal device includes: a processing unit, configured to determine a transmit power of a first signal based on a first value, where the first value is a value in a reference value set, the reference value set includes at least two power values, the first value does not exceed a first power, and the first power is determined based on a maximum transmit power of the first signal; and a sending unit, configured to send indication information to a second terminal device, where the indication information is used to indicate or includes the first value, where the sending unit is further configured to send the first signal to the second terminal device based on the transmit power of the first signal.

With reference to the third aspect, in a possible implementation, the first value does not exceed a second power, and the second power is determined based on a path loss estimate between a network device and the first terminal device.

With reference to any one of the third aspect or the possible implementations of the third aspect, the reference value set is configured by the network device; the reference value set is predefined; or the reference value set is determined by a higher layer of the first terminal device.

With reference to any one of the third aspect or the possible implementations of the third aspect, the first value is used to indicate a transmit power on a first orthogonal frequency division multiplexing OFDM symbol on which the first signal is located; the first value is used to indicate a transmit power on a first resource element RE of a first OFDM symbol on which the first signal is located; or the first value is used to indicate a transmit power on a first resource block RB of a first OFDM symbol on which the first signal is located.

With reference to any one of the third aspect or the possible implementations of the third aspect, the transmit power of the first signal is a power value corresponding to the first value; or the transmit power of the first signal is a sum of a power value corresponding to the first value and a power offset value.

With reference to any one of the third aspect or the possible implementations of the third aspect, the power offset value is predefined, or the power offset value is determined by the first terminal device.

With reference to any one of the third aspect or the possible implementations of the third aspect, the first signal includes a sidelink synchronization signal block SSSB, the SSSB includes a physical sidelink broadcast channel PSBCH, a primary sidelink synchronization signal PSSS, and a secondary sidelink synchronization signal SSSS, and the indication information includes at least one of the following: load information of the PSBCH; a demodulation reference signal DMRS sequence of the PSBCH; and a power difference between at least two of the PSBCH, the PSSS, and the SSSS.

With reference to any one of the third aspect or the possible implementations of the third aspect, when the indication information includes the power difference between the at least two of the PSBCH, the PSSS, and the SSSS, there is a mapping relationship between the first value and the power difference, where the mapping relationship is configured by the network device; the mapping relationship is predefined; or the mapping relationship is determined by the higher layer of the first terminal device.

With reference to any one of the third aspect or the possible implementations of the third aspect, the first signal includes a physical sidelink shared channel PSSCH, and the indication information is carried in the PSSCH; the first signal includes a physical sidelink control channel PSCCH, and the indication information is carried in the PSCCH; or the first signal includes a physical sidelink feedback channel PSFCH, and the indication information is carried in the PSFCH.

With reference to any one of the third aspect or the possible implementations of the third aspect, the first signal includes a reference signal, the indication information includes a sequence of the reference signal, and the reference signal is used to determine channel state information between the first terminal device and the second terminal device.

With reference to any one of the third aspect or the possible implementations of the third aspect, the first terminal device further includes: a receiving unit, configured to receive a second signal from the second terminal device, where a transmit power of the second signal is determined based on a path loss estimate between the first terminal device and the second terminal device, and the path loss estimate between the first terminal device and the second terminal device is determined based on the transmit power of the first signal and a receive power of the first signal.

With reference to any one of the third aspect or the possible implementations of the third aspect, the transmit power of the second signal satisfies the following formula:

$$P_2=\min\{P_{CMAX\_2}, y(M)+P_{O\_1}+\alpha_1 \cdot PL_{SL}+f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

With reference to any one of the third aspect or the possible implementations of the third aspect, the transmit power of the second signal is determined based on the path loss estimate between the first terminal device and the second terminal device and a path loss estimate between the network device and the second terminal device.

With reference to any one of the third aspect or the possible implementations of the third aspect, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{DL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

According to a fourth aspect, an embodiment of this application further provides a power control apparatus. The power control apparatus is used as a second terminal device, and the second terminal device includes: a receiving unit, configured to receive a first signal and indication information from a first terminal device, where the indication information is used to indicate or includes a first value, the first value is a value in a reference value set, the reference value set includes at least two power values, the first value does not exceed a first power, and the first power is determined based on a maximum transmit power of the first signal; and a processing unit, configured to determine a path loss estimate between the first terminal device and the second terminal device based on the indication information and a receive power of the first signal.

With reference to the fourth aspect, in a possible implementation, the first value does not exceed a second power, and the second power is determined based on a path loss estimate between a network device and the first terminal device.

With reference to any one of the fourth aspect or the possible implementations of the fourth aspect, the processing unit is further configured to determine a transmit power of a second signal based on the path loss estimate between the first terminal device and the second terminal device; and the second terminal device further includes a sending unit, configured to send the second signal to the first terminal device based on the transmit power of the second signal.

With reference to any one of the fourth aspect or the possible implementations of the fourth aspect, the transmit power of the second signal satisfies the following formula:

$$P_2=\min\{P_{CMAX\_2}, y(M)+P_{O\_1}+\alpha_1 \cdot PL_{SL}+f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

With reference to any one of the fourth aspect or the possible implementations of the fourth aspect, the processing unit is specifically configured to determine the transmit power of the second signal based on the path loss estimate between the first terminal device and the second terminal device and a path loss estimate between the network device and the second terminal device.

With reference to any one of the fourth aspect or the possible implementations of the fourth aspect, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{DL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

With reference to any one of the fourth aspect or the possible implementations of the fourth aspect, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 PL_{DL}+f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

With reference to any one of the fourth aspect or the possible implementations of the fourth aspect, the first terminal device includes a terminal device in a terminal device set, where a path loss estimate between the terminal device and the second terminal device is the largest.

With reference to any one of the fourth aspect or the possible implementations of the fourth aspect, the terminal device set is a set of terminal devices that each establish a connection to the second terminal device, or the terminal device set is a set of terminal devices that each establish a connection to the second terminal device and whose distances from the second terminal device are within a reference range.

According to a fifth aspect, an embodiment of this application further provides a terminal device. The terminal device is used as a first terminal device, and the first terminal device includes a processor, a memory, and a transceiver. The processor is coupled to the memory, and the processor is configured to run an instruction or a program in the memory. The processor is configured to determine a transmit power of a first signal based on a first value, where the first value is a value in a reference value set, the reference value set includes at least two power values, the first value does not exceed a first power, and the first power is determined based on a maximum transmit power of the first signal. The transceiver is coupled to the processor, and the transceiver is configured to send indication information to a second terminal device, where the indication information is used to indicate or includes the first value. The transceiver is further configured to send the first signal to the second terminal device based on the transmit power of the first signal.

With reference to the fifth aspect, in a possible implementation, the first value does not exceed a second power, and the second power is determined based on a path loss estimate between a network device and the first terminal device.

With reference to any one of the fifth aspect or the possible implementations of the fifth aspect, the reference value set is configured by the network device; the reference value set is predefined; or the reference value set is determined by a higher layer of the first terminal device.

With reference to any one of the fifth aspect or the possible implementations of the fifth aspect, the first value is used to indicate a transmit power on a first orthogonal frequency division multiplexing OFDM symbol on which the first signal is located; the first value is used to indicate a transmit power on a first resource element RE of a first OFDM symbol on which the first signal is located; or the first value is used to indicate a transmit power on a first resource block RB of a first OFDM symbol on which the first signal is located.

With reference to any one of the fifth aspect or the possible implementations of the fifth aspect, the transmit power of the first signal is a power value corresponding to the first value; or the transmit power of the first signal is a sum of a power value corresponding to the first value and a power offset value.

With reference to any one of the fifth aspect or the possible implementations of the fifth aspect, the power offset value is predefined, or the power offset value is determined by the first terminal device.

With reference to any one of the fifth aspect or the possible implementations of the fifth aspect, the first signal includes a sidelink synchronization signal block SSSB, the SSSB includes a physical sidelink broadcast channel PSBCH, a primary sidelink synchronization signal PSSS, and a secondary sidelink synchronization signal SSSS, and the indication information includes at least one of the following: load information of the PSBCH; a demodulation reference signal DMRS sequence of the PSBCH; and a power difference between at least two of the PSBCH, the PSSS, and the SSSS.

With reference to any one of the fifth aspect or the possible implementations of the fifth aspect, when the indication information includes the power difference between the at least two of the PSBCH, the PSSS, and the SSSS, there is a mapping relationship between the first value and the power difference, where the mapping relationship is configured by the network device; the mapping relationship is predefined; or the mapping relationship is determined by the higher layer of the first terminal device.

With reference to any one of the fifth aspect or the possible implementations of the fifth aspect, the first signal includes a physical sidelink shared channel PSSCH, and the indication information is carried in the PSSCH; the first signal includes a physical sidelink control channel PSCCH, and the indication information is carried in the PSCCH; or the first signal includes a physical sidelink feedback channel PSFCH, and the indication information is carried in the PSFCH.

With reference to any one of the fifth aspect or the possible implementations of the fifth aspect, the first signal includes a reference signal, the indication information includes a sequence of the reference signal, and the reference signal is used to determine channel state information between the first terminal device and the second terminal device.

With reference to any one of the fifth aspect or the possible implementations of the fifth aspect, the transceiver is further configured to receive a second signal from the second terminal device, where a transmit power of the second signal is determined based on a path loss estimate between the first terminal device and the second terminal device, and the path loss estimate between the first terminal device and the second terminal device is determined based on the transmit power of the first signal and a receive power of the first signal.

With reference to any one of the fifth aspect or the possible implementations of the fifth aspect, the transmit power of the second signal satisfies the following formula:

$$P_2=\min\{P_{CMAX\_2}, y(M)+P_{O\_1}+\alpha_1 \cdot PL_{SL}+f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

With reference to any one of the fifth aspect or the possible implementations of the fifth aspect, the transmit power of the second signal is determined based on the path loss estimate between the first terminal device and the second terminal device and a path loss estimate between the network device and the second terminal device.

With reference to any one of the fifth aspect or the possible implementations of the fifth aspect, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{SL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

With reference to any one of the fifth aspect or the possible implementations of the fifth aspect, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{DL}+f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

According to a sixth aspect, an embodiment of this application further provides a terminal device. The terminal device is used as a second terminal device, and the second terminal device includes a processor, a memory, and a transceiver. The processor is coupled to the memory, and the processor is configured to run an instruction or a program in the memory. The transceiver is coupled to the processor, and the transceiver is configured to receive a first signal and indication information from a first terminal device, where the indication information is used to indicate or includes a first value, the first value is a value in a reference value set, the reference value set includes at least two power values, the first value does not exceed a first power, and the first power is determined based on a maximum transmit power of the first signal. The processor is configured to determine a path loss estimate between the first terminal device and the second terminal device based on the indication information and a receive power of the first signal.

With reference to the sixth aspect, in a possible implementation, the first value does not exceed a second power, and the second power is determined based on a path loss estimate between a network device and the first terminal device.

With reference to any one of the sixth aspect or the possible implementations of the sixth aspect, the processor is further configured to determine a transmit power of a second signal based on the path loss estimate between the first terminal device and the second terminal device; and the transceiver is further configured to send the second signal to the first terminal device based on the transmit power of the second signal.

With reference to any one of the sixth aspect or the possible implementations of the sixth aspect, the transmit power of the second signal satisfies the following formula:

$$P_2 = \min\{P_{CMAX\_2}, y(M) + P_{O\_1} + \alpha_1 \cdot PL_{SL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

With reference to any one of the sixth aspect or the possible implementations of the sixth aspect, the processor is specifically configured to determine the transmit power of the second signal based on the path loss estimate between the first terminal device and the second terminal device and a path loss estimate between the network device and the second terminal device.

With reference to any one of the sixth aspect or the possible implementations of the sixth aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

With reference to any one of the sixth aspect or the possible implementations of the sixth aspect, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

With reference to any one of the sixth aspect or the possible implementations of the sixth aspect, the first terminal device includes a terminal device in a terminal device set, where a path loss estimate between the terminal device and the second terminal device is the largest.

With reference to any one of the sixth aspect or the possible implementations of the sixth aspect, the terminal device set is a set of terminal devices that each establish a connection to the second terminal device, or the terminal device set is a set of terminal devices that each establish a connection to the second terminal device and whose distances from the second terminal device are within a reference range.

According to a seventh aspect, an embodiment of this application provides a computer-readable storage medium. The computer-readable storage medium stores instructions, and when the instructions are run on a computer, the computer is enabled to perform the method according to the foregoing aspects.

According to an eighth aspect, an embodiment of this application provides a computer program product including instructions. When the computer program product runs on a computer, the computer is enabled to perform the method according to the foregoing aspects.

DETAILED DESCRIPTION OF ILLUSTRATIVE EMBODIMENTS

The following describes the embodiments of this application with reference to the accompanying drawings in the embodiments of this application.

In the specification, claims, and accompanying drawings of this application, the terms "first", "second", and the like are intended to distinguish between different objects rather than describing a particular order. In addition, the terms "including" and "having", and any variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects and represents that three relationships may exist. For example, "A and/or B" may represent the following three cases: Only A exists, only B exists, and both A and B exist. A and B may be singular or plural. The character "/" usually represents an "or" relationship between the associated objects. "At least one of the following items (pieces)" or a similar expression thereof means any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The following specifically describes scenarios in the embodiments of this application.

Figure 1:
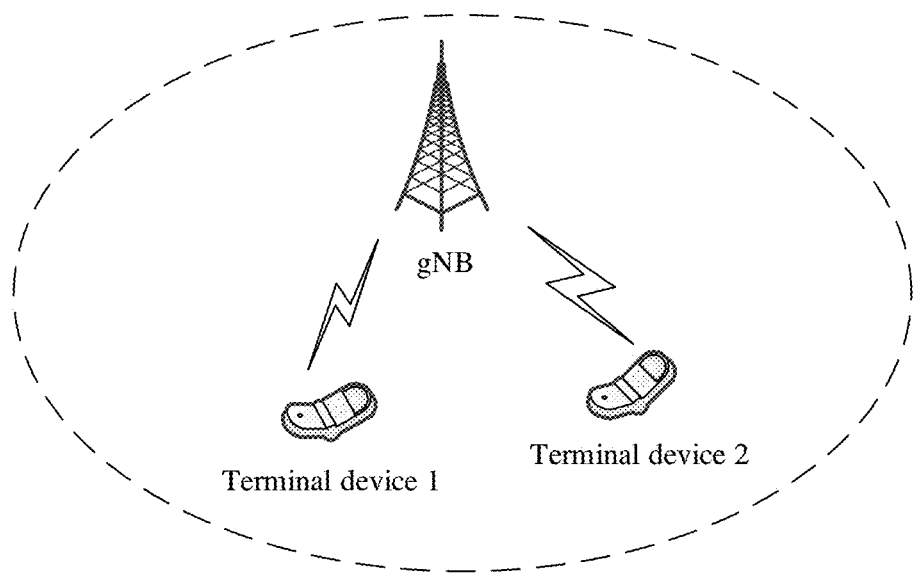
FIG. 1 is a schematic structural diagram of a communications system according to an embodiment of this application.

A communications system used in this application may be understood as a wireless cellular communications system, or may be understood as a wireless communications system based on a cellular network architecture, for example, a 5th generation (5th-generation, 5G) mobile communications system or a next-generation mobile communications system. FIG. 1 is a schematic diagram of a communications system according to an embodiment of this application. Solutions in this application are applicable to the communications system. The communications system may include at least one network device. Only one network device is shown, for example, a next-generation NodeB (the next generation Node B, gNB) in the figure. In addition, the communications system may include one or more terminal devices connected to the network device, for example, a terminal device 1 and a terminal device 2 in the figure.

The network device may be a device that can communicate with the terminal device. The network device may be any device that has a wireless transceiver function, including but not limited to a base station. For example, the base station may be a gNB, or the base station is a base station in a future communications system. Optionally, the network device may alternatively be an access node, a wireless relay node, a wireless backhaul node, or the like in a wireless local area network (wireless fidelity, Wi-Fi) system. Optionally, the network device may alternatively be a radio controller in a cloud radio access network (cloud radio access network, CRAN) scenario. Optionally, the network device may alternatively be a wearable device, a vehicle-mounted device, or the like. Optionally, the network device may alternatively be a small cell, a transmission reception point (transmission reference point, TRP), or the like. Certainly, this application is not limited thereto.

The terminal device may also be referred to as user equipment (user equipment, UE), a terminal, or the like. The terminal device is a device having a wireless transceiver function. The terminal device may be deployed on land, and includes an indoor device, an outdoor device, a handheld device, a wearable device, or a vehicle-mounted device; or may be deployed on a water surface, for example, on a ship; or may be deployed in the air, for example, on an airplane, a balloon, or a satellite. The terminal device may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like.

It may be understood that, in the communications system shown in FIG. 1, the terminal device 1 and the terminal device 2 may also communicate with each other according to a device-to-device (device to device, D2D) technology or a vehicle-to-everything (vehicle-to-everything, V2X) technology.

Figure 2A:
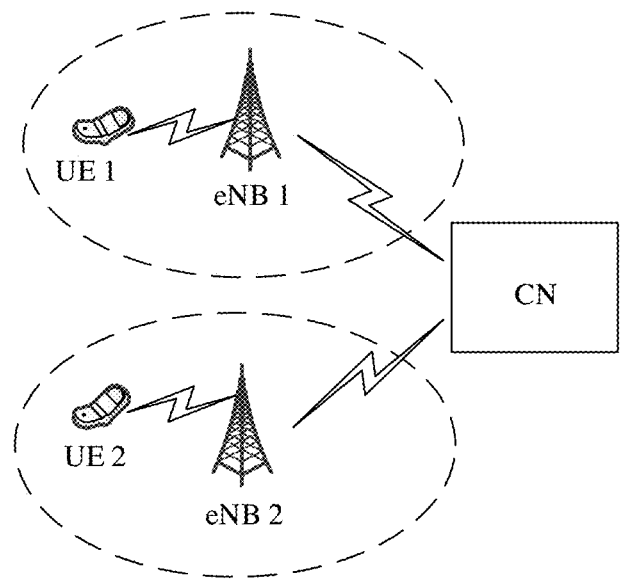
FIG. 2a is a schematic diagram of a transmission path according to an embodiment of this application.

In a common wireless communications system, for example, in a long term evolution (long term evolution, LTE) system, when the terminal device 1 and the terminal device 2 need to exchange data, a transmission path may be shown in FIG. 2*a*. FIG. 2*a* is a schematic diagram of a transmission path between terminal devices according to an embodiment of this application. As shown in FIG. 2*a*, the terminal device 1 may first send data to an evolved NodeB (evolved NodeB, eNodeB) 1, and then the eNB 1 sends the data to a core network (core network, CN). The CN may include, for example, a serving gateway (serving gateway, SGW), a PDN gateway (PDN gateway, PGW), and a mobility management entity (mobility management entity, MME). After the CN receives the data, the CN sends the data to an eNB 2, and then the eNB 2 sends the received data to the terminal device 2. It may be understood that FIG. 2*a* is described by using an example in which the terminal device is UE. However, the UE shown in FIG. 2*a* should not be understood as a limitation on this application.

It may be understood that the transmission path shown in FIG. 2*a* is merely an example. In specific implementation, the terminal device 1 and the terminal device 2 may belong to a same cell or the like. The transmission path shown in FIG. 2*a* is not uniquely limited in the embodiments of this application.

However, 5th generation (5th-generation, 5G) new radio (new radio, NR) is a newly proposed topic in the 3rd generation partnership project (3rd generation partnership project, 3GPP) organization, and is in Release 14. In the past 10 years, the LTE standard proposed by the 3GPP organization has been widely used in the world, and is referred to as the 4th generation (4th-generation, 4G). For example, China Mobile, China Unicom, and China Telecom each use transmission technologies in a 4G LTE time division duplex (time division duplexing, TDD) mode and frequency division duplex (frequency division duplexing, FDD) mode, and provide high-speed and convenient mobile network services for a large quantity of users.

However, as a next-generation 5G technology is discussed, there is a problem of whether a system structure and an access process that have been standardized in 4G LTE continue to be adopted. Because a communications system is backward-compatible, a newly developed technology tends to be compatible with a previously standardized technology. In addition, because there are many existing designs in 4G LTE, to achieve compatibility, flexibility of 5G is inevitably sacrificed to a great extent. Consequently, performance is reduced. Therefore, currently, in the 3GPP organization, research is concurrently conducted in two directions. In the two directions, a technical discussion group that does not consider backward compatibility is referred to as 5G NR.

Further, with evolution of communications technologies, the internet of everything also continuously accelerates. 3GPP specifications introduce a plurality of internet of everything technologies, such as an NB-IoT technology and an eMTC technology. These technologies are all internet of things technologies. In addition, 3GPP further introduces a thing-to-thing technology and an end-to-end technology, such as D2D. D2D is a general name. A proximity-based service (proximity-based service, ProSe) is a service based on a short distance, and is a service name for implementing a D2D technology in 3GPP. A sidelink (sidelink communication, SL) communications technology is a technology for implementing the ProSe service. Vehicle-to-everything (vehicle-to-everything, V2X) is also a thing-to-thing technology.

Figure 2B:
FIG. 2b is a schematic diagram of another transmission path according to an embodiment of this application.
Figure 2C:
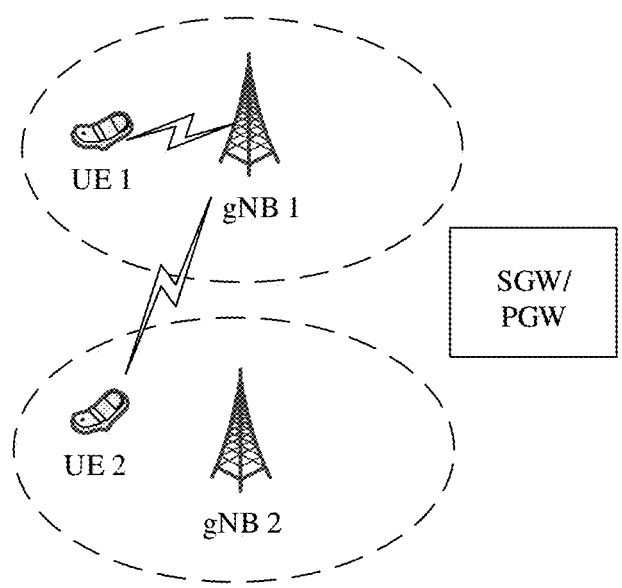
FIG. 2C is a schematic diagram of still another transmission path according to an embodiment of this application.

In a thing-to-thing sidelink system, for example, in the D2D technology (which is also referred to as the proximity-based service (proximity-based service, ProSe)), when the terminal device 1 and the terminal device 2 need to exchange data, the transmission path may be shown in FIG. 2b or FIG. 2c. As shown in FIG. 2b, the terminal device 1 and the terminal device 2 may directly exchange data. As shown in FIG. 2c, the terminal device 1 and the terminal device 2 may alternatively exchange data through only gNBs. It may be understood that the gNB shown in the figure is merely an example, and should not be construed as a limitation on this application.

In other words, on a sidelink (sidelink), two terminal devices may directly transmit data, and the data does not need to be first sent to a base station and then forwarded through a core network to a receiving terminal device. This can greatly reduce a data latency. However, because a transmit power of a terminal device is limited, the sidelink is usually limited to communication at a relatively short distance. For example, the D2D technology may be applied to a proximity feature-based social application. For example, data transmission between adjacent terminal devices, such as content sharing or an interactive game, is performed according to D2D. The D2D technology may be further used to resolve a problem that an obstacle to rescue is caused when communication is interrupted due to communications infrastructure damage caused by a natural disaster. For example, in this scenario, wireless communication can still be established between two adjacent terminal devices according to D2D. For another example, information such as a commodity discount and promotion and a cinema trailer may be further pushed to a user according to D2D. A scenario to which D2D is applied is not uniquely limited in the embodiments of this application.

The following uses D2D as an example to describe a sidelink communication scenario.

FIG. 3a to FIG. 3g each are a schematic diagram of a sidelink communication scenario according to an embodiment of this application. It may be understood that in the figure, UE is used as an example to describe the sidelink communication scenario. However, the UE should not be understood as a limitation on the embodiments of this application.

Figure 3A:
FIG. 3a is a schematic diagram of a sidelink communication scenario according to an embodiment of this application.

In the scenario shown in FIG. 3a, both a terminal device 1 and a terminal device 2 are located outside a cell coverage area.

Figure 3B:
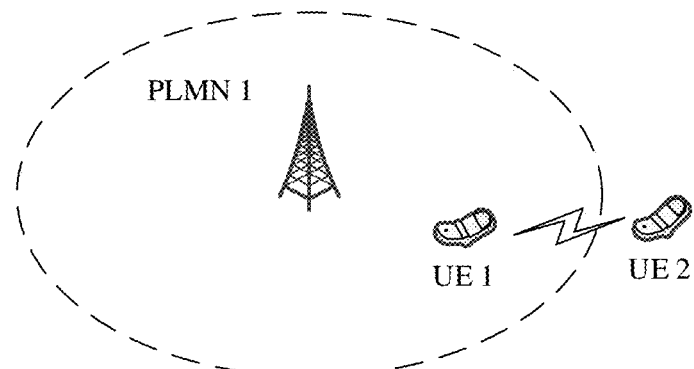
FIG. 3b is a schematic diagram of another sidelink communication scenario according to an embodiment of this application.

In the scenario shown in FIG. 3b, a terminal device 1 is located within a cell coverage area, and a terminal device 2 is located outside the cell coverage area.

Figure 3C:
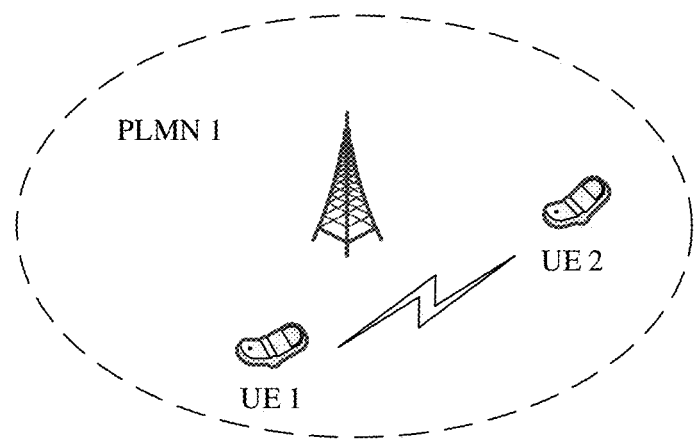
FIG. 3c is a schematic diagram of still another sidelink communication scenario according to an embodiment of this application.

In the scenario shown in FIG. 3c, both a terminal device 1 and a terminal device 2 are located within a coverage area of a same cell, and are in one public land mobile network (public land mobile network, PLMN), for example, a PLMN 1.

Figure 3D:
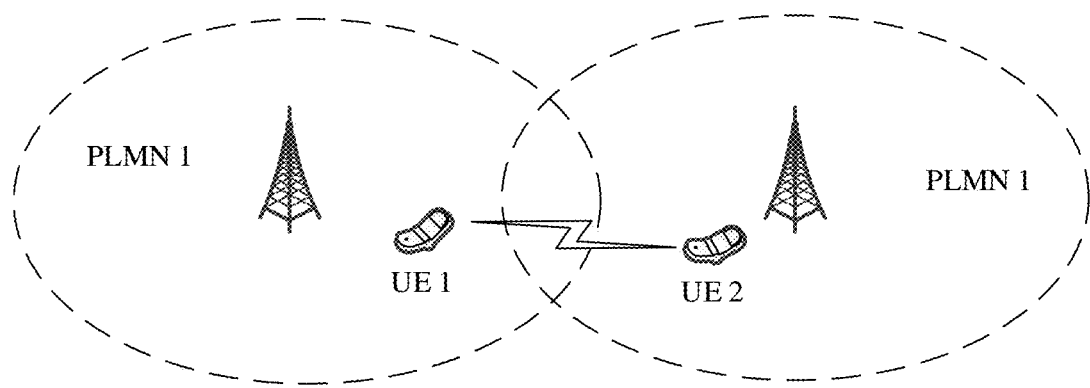
FIG. 3d is a schematic diagram of still another sidelink communication scenario according to an embodiment of this application.

In the scenario shown in FIG. 3d, a terminal device 1 and a terminal device 2 are in one PLMN, for example, a PLMN 1, but are located within coverage areas of different cells.

Figure 3E:
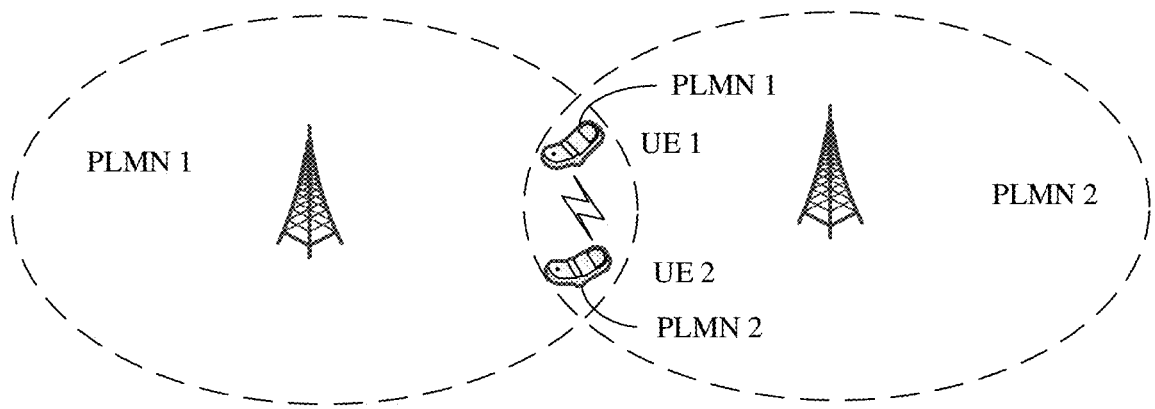
FIG. 3e is a schematic diagram of still another sidelink communication scenario according to an embodiment of this application.

In the scenario shown in FIG. 3e, a terminal device 1 and a terminal device 2 are located in different PLMNs and different cells, and the terminal device 1 and the terminal device 2 are located within a joint coverage area of the two cells. For example, the terminal device 1 is in a PLMN 1, and the terminal device 2 is in a PLMN 2.

Figure 3F:
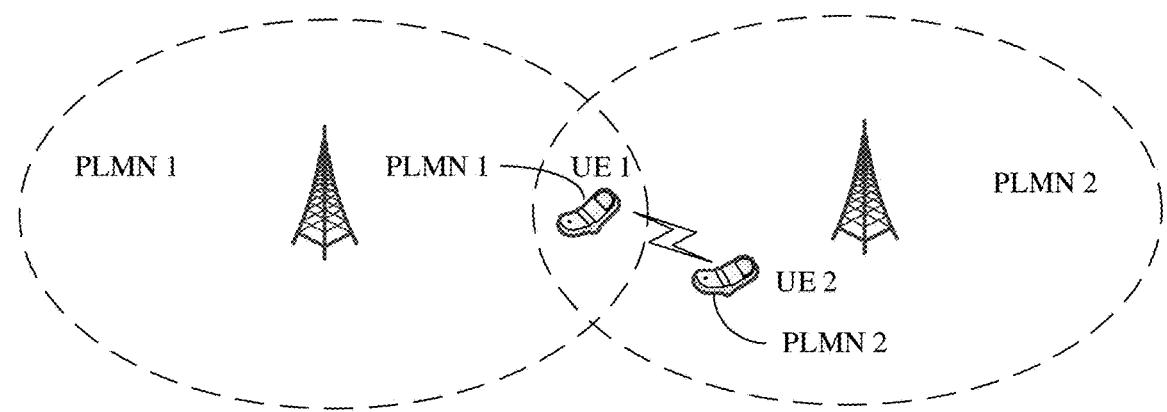
FIG. 3f is a schematic diagram of still another sidelink communication scenario according to an embodiment of this application.

In the scenario shown in FIG. 3f, a terminal device 1 and a terminal device 2 are located in different PLMNs and different cells, the terminal device 1 is located within a joint coverage area of the two cells, and the terminal device 2 is located within a coverage area of a serving cell.

Figure 3G:
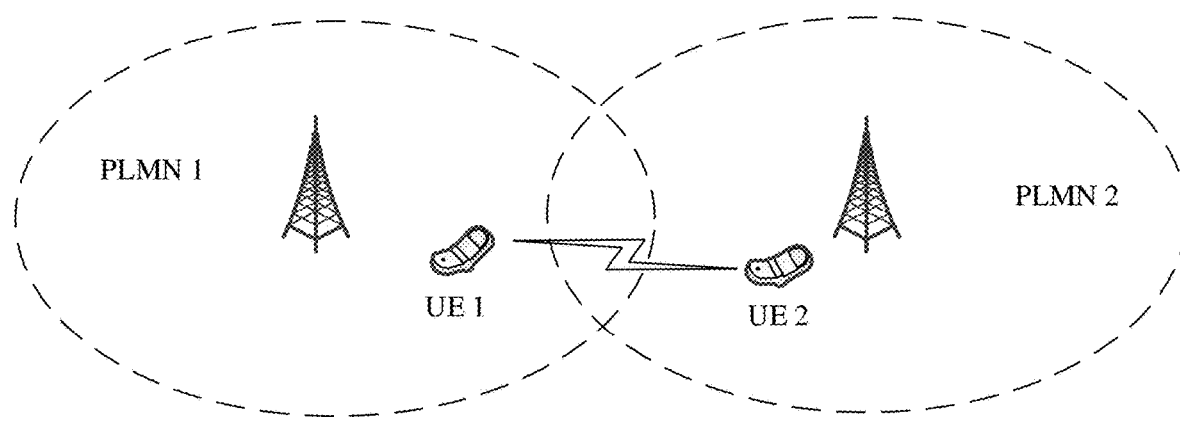
FIG. 3g is a schematic diagram of still another sidelink communication scenario according to an embodiment of this application.

In the scenario shown in FIG. 3g, a terminal device 1 and a terminal device 2 are located in different PLMNs and different cells, and the terminal device 1 and the terminal device 2 are located within coverage areas of respective serving cells.

It may be understood that the foregoing scenario is also applicable to vehicle-to-everything (vehicle-to-everything, V2X), which may also be referred to as vehicle-to-everything (vehicle to everything, V2X). Details are not described herein.

It may be understood that the sidelink (sidelink) described in the embodiments of this application may also be understood as a sidelink (sidelink) or the like. A specific name of the sidelink is not uniquely limited in the embodiments of this application.

Further, in the 3GPP standard, a communications interface between a terminal device and a base station is referred to as a UU interface, and a communications interface between terminal devices is referred to as a PC5 interface. The following uses an example to describe uplink power control on the UU interface in NR.

A physical uplink shared channel (physical uplink shared channel, PUSCH) is used as an example. A formula that a power of the physical uplink shared channel satisfies may be shown as follows:

$$P_{PUSCH,b,f,c}(i,j,q_d,l) = \min\begin{Bmatrix} P_{cMAX,f,c}(i), \\ P_{O\_PUSCH,b,f,c}(j) + 10\log_{10}(2^u \times M_{RB,b,f,c}^{PUSCH}(i)) + \\ \alpha_{b,f,c}(j) \times PL_{b,f,c}(q_d) + \Delta_{TF,b,f,c}(i) + f_{b,f,c}(i,l) \end{Bmatrix} [dBm] \quad (1)$$

In general, a final transmit power is a smaller value in two items. The first item is $P_{CMAX,f,c}$. This item may represent a maximum transmit power of the PUSCH. It may be understood that, in some implementations, the maximum transmit power of the PUSCH may also be understood as a maximum transmit power of the terminal device. The second item is a relatively complex formula. Specifically, a manner of understanding the entire formula is as follows: The terminal device should calculate a transmit power according to the formula in the second item. When a value calculated according to the formula in the second item exceeds the maximum transmit power (namely, a value obtained according to the formula in the first item) of the terminal device, because physical hardware of the terminal device is limited, the transmit power required by the formula in the second item cannot be reached. Therefore, the terminal device can transmit a signal based on only the maximum transmit power (namely, the value obtained according to the formula in the first item).

The formula (1) is described in detail below.

$P_{O\_PSCH, f, c}(j)$ is a target power of the PUSCH, and may be specifically understood as a target power value of the PUSCH at the base station, that is, a power that the PUSCH is expected to reach when the PUSCH arrives at the base station. This value may be configured by the base station.

$PL_{b, f, c}(q_d)$ is estimated by the terminal device based on a downlink signal sent by the base station. Specifically, based on a signal such as a synchronization signal block (synchronization signal block, SSB) sent by the base station, the terminal device calculates a receive power of the SSB. In addition, the base station broadcasts a transmit power of the SSB on a physical broadcast channel (physical broadcast channel, PBCH). The terminal device can obtain a downlink path loss estimate between the base station and the terminal device by comparing the receive power and the transmit power of the SSB. In this case, the terminal device may obtain uplink and downlink path loss estimates (for example, the uplink path loss estimate between the base station and the terminal device is approximately the same as the downlink path loss estimate between the base station and the terminal device) according to channel reciprocity.

$\alpha_{b, f, c}(j) \times PL_{b, f, c}(q_d)$ is a path loss compensation value. Herein, $PL_{b, f, c}(q_d)$ is a path loss estimate, and $\alpha_{b, f, c}(j)$ is a path loss compensation factor. When a value of $\alpha_{b, f, c}(j)$ is 1, it indicates that a path loss is fully compensated for. It may be understood that the value of $\alpha_{b, f, c}(j)$ may be configured by the base station.

$P_{O\_PUSCH, f, c}(i) \, \alpha_{b, f, c}(j) \cdot PL_{b, f, c}(q_d)$ may be understood as follows: After the target power at the base station is specified, path loss compensation is performed for the target power, so that a target transmit power of the terminal device may be obtained.

In the formula $10 \log_{10}(2^\mu \cdot M_{RB, b, f, c}^{PUSCH}(i))$, $2^\mu \cdot M_{RB, b, f, c}^{PUSCH}(i)$ is bandwidth of the PUSCH, $M_{RB,b, f, c}^{PUSCH}(i)$ may represent a quantity of RBs of the PUSCH, and μ represents a numerology (numerology) used when the terminal device performs transmission. Alternatively, μ may be understood as a numerology set or the like. A specific name of μ is not limited in the embodiments of this application.

Therefore, $P_{O\_PUSCH, f, c}(i)+\alpha_{b, f, c}(j) \cdot PL_{b, f, c}(q_d)$ may be specifically understood as a target transmit power of a signal per unit bandwidth. In this case, $P_{O\_PUSCH, f, c}(i)+10\log_{10}(2^\mu \cdot M_{RB, b, f, c}^{PUSCH}(i))+\alpha_{b, f, c}(j) \cdot PL_{b, f, c}(q_d)$ may be understood as a target transmit power of a signal in the entire PUSCH bandwidth. Further, a combination of the three items may be referred to as "open-loop power control". To be specific, the terminal device estimates a path loss based on a target receive power and performs compensation, to determine the transmit power (in other words, no feedback or adjustment of the base station is required).

$\Delta_{TF, b, f, c}(i)+f_{b, f, c}(i)$ is a "closed-loop power adjustment" part. $\Delta_{TF, b, f, c}(i)$ may represent adjustment performed by the terminal device for the transmit power of the current PUSCH. For example, if a modulation order used for the current PUSCH is higher, to ensure transmission reliability, a required transmit power is higher. $f_{b, f, c}(i)$ is a "transmit power command" part in which the base station directly adjusts the transmit power. The base station directly indicates, by using downlink control information (downlink control information, DCI), whether the transmit power of the current PUSCH needs to be increased or decreased.

In addition, in LTE, sidelink transmission may further include the following channels: a physical sidelink shared channel (physical sidelink shared channel, PSSCH), a physical sidelink control channel (physical sidelink control channel, PSCCH), and a physical sidelink discovery channel (physical sidelink discovery channel, PSDCH). In an example, powers of the three channels respectively satisfy the following formulas:

$$P_{PSSCH} = \min\{P_{CMAX,PSSCH}, 10\log_{10}(M_{PSSCH}) + P_{O\_PSSCH} + \alpha_{PSSCH} \cdot PL\} \quad (2)$$

$$P_{PSCCH} = \min\{P_{CMAX,PSCCH}, 10\log_{10}(M_{PSCCH}) + P_{O\_PSCCH} + \alpha_{PSCCH} \cdot PL\} \quad (3)$$

$$P_{PSDCH} = \min\{P_{CMAX,PSDCH}, 10\log_{10}(M_{PSDCH}) + P_{O\_PSDCH} + \alpha_{PSDCH} \cdot PL\} \quad (4)$$

Herein, $P_{PSSCH}$ is a transmit power of the PSSCH, $P_{PSCCH}$ is a transmit power of the PSCCH, and $P_{PSDCH}$ is a transmit power of the PSDCH. $P_{CMAX,PSSCH}$ is a maximum transmit power of the PSSCH, $P_{CMAX,PSCCH}$ is a maximum transmit power of the PSCCH, and $P_{CMAX,PSDCH}$ is a maximum transmit power of the PSDCH. $M_{PSSCH}$ is bandwidth of the PSSCH, $M_{PSCCH}$ is bandwidth of the PSCCH, and $M_{PSDCH}$ is bandwidth of the PSDCH. $P_{O\_PSSCH}$ is a target power of the PSSCH, $P_{O\_PSCCH}$ is a target power of the PSCCH, and $P_{O\_PSDCH}$ is a target power of the PSDCH. PL is a path loss estimate between the base station and the terminal device.

It can be learned that, in LTE sidelink transmission, PL is still a path loss estimate obtained based on a downlink signal, instead of a path loss estimate obtained based on a sidelink between a transmitting terminal device and a receiving terminal device. A reason is as follows: When an LTE sidelink is designed, a hybrid automatic repeat request (hybrid automatic repeat request, HARQ) feedback is not supported at a physical layer. Therefore, the transmitting terminal device (or a transmitting end) can transmit a signal only based on a relatively high transmit power as much as possible, to ensure transmission reliability. However, the transmit power cannot be excessively high, to avoid interference to an uplink signal of another terminal device (for example, the base station originally needs to receive the uplink signal of the another terminal device, but the power of the signal of the transmitting terminal device on the sidelink is excessively high and causes relatively large interference to the uplink signal of the another terminal device, and consequently, the base station cannot normally receive the uplink signal of the another terminal device). Therefore, the embodiments of this application provide a power control method. To be specific, a transmit power of a terminal device on a sidelink is determined by referencing a path loss estimate between a transmitting terminal device and a receiving terminal device.

Figure 4:
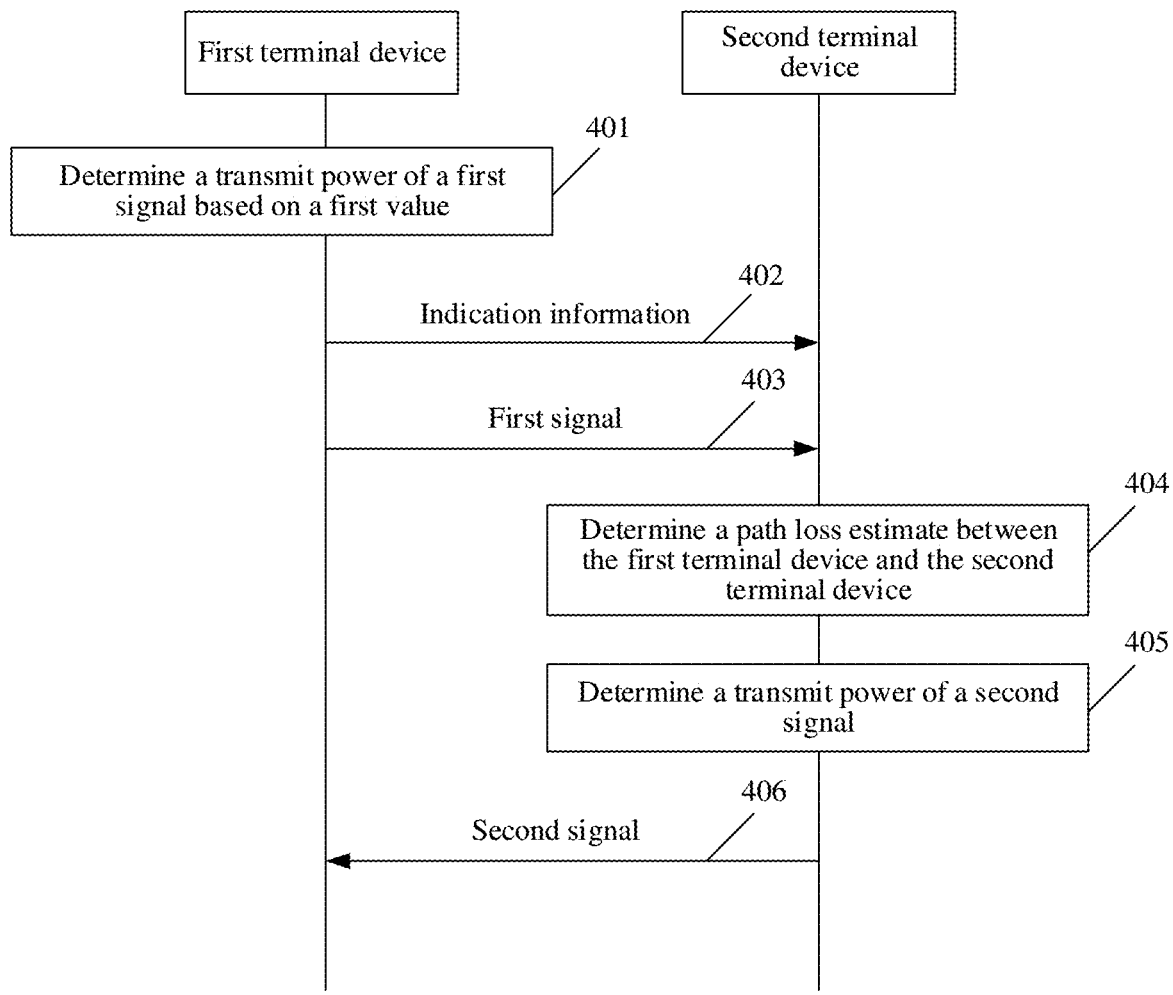
FIG. 4 is a schematic flowchart of a power control method according to an embodiment of this application.

FIG. 4 is a schematic flowchart of a power control method according to an embodiment of this application. The power control method may be applied to any scenario shown in FIG. 3a to FIG. 3g, and the power control method may be further applied to the communications system shown in FIG. 1. As shown in FIG. 4, the power control method includes the following steps.

401: A first terminal device determines a transmit power of a first signal based on a first value, where the first value is a value in a reference value set, the reference value set includes at least two power values, the first value does not exceed a first power, and the first power is determined based on a maximum transmit power of the first signal.

In this embodiment of this application, the reference value set may include the at least two power values. The power value may be specifically understood as a transmit power value of a signal. In other words, the reference value set may include K optional power values, and K is an integer greater than or equal to 2. For example, the reference value set may include the first value, a second value, a third value, and the like. A specific quantity of power values included in the reference value set is not limited in this embodiment of this application. The reference value set may be configured by a network device such as a base station, may be predefined, or may be determined by a higher layer of the first terminal device. For example, when both the first terminal device and a second terminal device are located within a coverage area of a same cell, the reference value set may be configured by the base station, so that both the first terminal device and the second terminal device can learn of the reference value set. For another example, when the first terminal device is located outside a cell coverage area, the reference value set may be predefined. A case in which the first terminal device cannot determine the transmit power of the first signal because the first terminal device cannot learn of the reference value set can be avoided by predefining the reference value set. For another example, the first terminal device may determine the reference value set by using an application layer, a radio resource control (radio resource control, RRC) layer, or the like. For another example, the first terminal device may alternatively negotiate the reference value set with a second terminal device by using an application layer or an RRC layer.

Specifically, the first terminal device may select the first value from the K optional power values. A restrictive condition for the first value includes, for example, not exceeding the first power. The first power may be determined based on the maximum transmit power of the first signal. It may be understood that in some implementations, for example, when the terminal device sends only the first signal, the maximum transmit power of the first signal may also be understood as a maximum transmit power of the terminal device. The maximum transmit power of the first terminal device may be understood as a maximum transmit power limited by physical hardware of the first terminal device, or may be understood as a maximum transmit power allowed by hardware of the first terminal device. For example, the maximum transmit power of the first terminal device may be obtained through calculation based on a higher layer configuration parameter of the base station.

Optionally, to avoid interference to an uplink signal of another terminal device that is caused due to an excessively high transmit power used by the first terminal device to transmit the first signal, the restrictive condition for the first value may further include, for example, not exceeding a second power. The second power is determined based on a path loss estimate between the first terminal device and the network device such as the base station.

It may be understood that when the first terminal device determines the first value from the K optional power values, a relationship between another value such as a second value or a third value included in the K optional power values and either of the first power and the second power is not limited in this embodiment of this application. For example, power values that satisfy the first power and the second power and that are determined by the first terminal device from the K optional power values include both the first value and the second value. In this case, the first terminal device may randomly determine a value, such as the first value, from the first value and the second value. Alternatively, in this case, the first terminal device may determine a larger value from the first value and the second value. For example, if the first value is greater than the second value, the first value may be determined. For another example, the first value determined by the first terminal device from the K optional power values can satisfy both the first power and the second power, but the second value satisfies only the first power but does not satisfy the second power.

It may be understood that, for a specific meaning represented by the first value, refer to descriptions in the following related embodiments. Details are not first described herein.

402: The first terminal device sends indication information to the second terminal device, where the indication information is used to indicate or includes the first value. The second terminal device receives the indication information from the first terminal device.

The indication information may be carried in different information based on different first signals. Alternatively, it may be understood that the indication information may be included in different information based on different first signals. To be specific, the indication information may have different types of indication forms or indication manners.

It may be understood that for a specific indication manner of the indication information, refer to descriptions in the following related embodiments. Details are not first described herein.

403: The first terminal device sends the first signal to the second terminal device based on the transmit power of the first signal. The second terminal device receives the first signal from the first terminal device.

It may be understood that, usually, a channel may also be understood as a signal. Therefore, in this embodiment of this application, the first signal may not only include a signal, but also include a channel. For example, the first signal may further include a physical sidelink shared channel (physical sidelink shared channel, PSSCH), a physical sidelink control channel (physical sidelink control channel, PSCCH), a physical sidelink feedback channel (physical sidelink feedback channel, PSFCH), and the like. It may be understood that the foregoing channels are merely examples, and another channel may be further included in specific implementation. This is not limited in this embodiment of this application.

404: The second terminal device determines a path loss estimate between the first terminal device and the second terminal device based on the indication information and a receive power of the first signal.

In this embodiment of this application, the second terminal device may obtain the transmit power of the first signal based on the first value indicated by the indication information. The transmit power of the first signal may be a power value corresponding to the first value, or the transmit power of the first signal may be a sum of a power value corresponding to the first value and a power offset value. In this way, the second terminal device may obtain the path loss estimate between the first terminal device and the second terminal device based on the transmit power of the first signal and the receive power of the first signal.

405: The second terminal device determines a transmit power of a second signal based on the path loss estimate between the first terminal device and the second terminal device.

In this embodiment of this application, the second signal may not only mean a signal, but also mean a channel. For specific descriptions of the second signal, refer to the specific descriptions of the first signal. Details are not described herein.

It may be understood that, for a formula that the transmit power of the second signal satisfies, specifically refer to the following embodiments. Details are not described herein.

406: The second terminal device sends the second signal to the first terminal device based on the transmit power of the second signal. The first terminal device receives the second signal.

In this embodiment of this application, the first terminal device indicates the first value to the second terminal device, so that the second terminal device can obtain the path loss estimate between the first terminal device and the second terminal device based on the first value. Therefore, the second terminal device can effectively determine the transmit power of the second signal during transmission on a sidelink. This improves efficiency of interaction between the terminal devices. In other words, the second terminal device determines the transmit power of the second signal by referencing the path loss estimate between the terminal devices on the sidelink, so that the transmit power of the second signal is better determined, and interference to an uplink signal of another terminal device is further avoided (to be specific, the second signal does not exceed a path loss estimate between the base station and the second terminal device). This ensures signal transmission reliability.

To vividly understand the power control method shown in FIG. 4, the following describes in detail a method in which the first terminal device sends the first signal to the second terminal device.

In some embodiments of this application, the first signal may include a sidelink synchronization signal block (sidelink synchronization signal block, S-SSB). The following first uses the SSSB as an example to describe the method shown in FIG. 4.

Figure 5A:
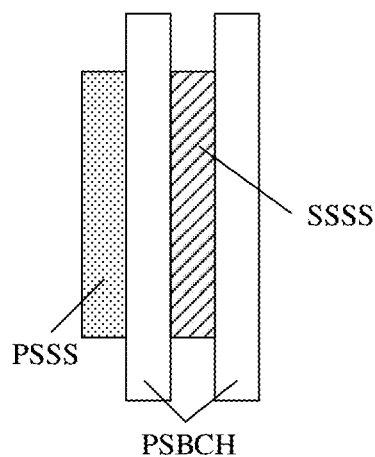
FIG. 5a is a schematic structural diagram of an S-SSB according to an embodiment of this application.

FIG. 5a is a schematic structural diagram of an S-SSB according to an embodiment of this application. As shown in FIG. 5a, the S-SSB may include a physical sidelink broadcast channel (physical sidelink broadcast channel, PSBCH), a primary sidelink synchronization signal (primary sidelink synchronization signal, PSSS), and a secondary sidelink synchronization signal (secondary sidelink synchronization signal, SSSS).

In this embodiment, when sending the S-SSB, the first terminal device may determine a transmit power of the S-SSB based on the first value. As shown in FIG. 5a, the S-SSB occupies four orthogonal frequency division multiplexing (orthogonal frequency division multiplexing, OFDM) symbols (symbol) in time domain. It can be learned from FIG. 5a that, the PSSS and the SSSS each occupy one OFDM symbol, and the PSBCH occupies two OFDM symbols. Therefore, the four OFDM symbols occupied by the S-SSB may be classified into a first OFDM symbol, a second OFDM symbol, a third OFDM symbol, and a fourth OFDM symbol. For example, the OFDM symbol occupied by the PSSS may be referred to as the first OFDM symbol, the OFDM symbol occupied by the SSSS may be referred to as the second OFDM symbol, and the two OFDM symbols occupied by the PSBCH may be respectively referred to as the third OFDM symbol and the fourth OFDM symbol. It may be understood that the structure of the S-SSB shown in FIG. 5a is merely an example. In specific implementation, a bandwidth relationship among the PSSS, the PSBCH, and the SSSS is not limited in this embodiment of this application. For example, bandwidth of the PSSS and bandwidth of the SSSS may be the same or may be different.

Optionally, the first value may be used to indicate a transmit power on the first OFDM symbol on which the S-SSB is located. When the first value indicates the transmit power on the first OFDM symbol occupied by the S-SSB, in this embodiment of this application, the following implementations may be provided based on whether transmit powers on the first OFDM symbol, the second OFDM symbol, and the third OFDM symbol are the same. It may be understood that transmit powers on the third OFDM symbol and the fourth OFDM symbol may be considered to be the same.

In some embodiments of this application, when the transmit powers on the first OFDM symbol, the second OFDM symbol, and the third OFDM symbol are the same, the transmit power of the S-SSB may satisfy the following formula:

$$P_{S\text{-}SSB} = P'_{S\text{-}SSB} \quad (5)$$

Herein, PS-SSB is the transmit power of the S-SSB, and $P'_{S\text{-}SSB}$ is the first value.

Specifically, $P'_{S\text{-}SSB}$ further satisfies the following formula:

$$P'_{S\text{-}SSB} \in \{P_{S\text{-}SSB,1}, P_{S\text{-}SSB,2}, P_{S\text{-}SSB,K}\} \quad (6)$$

Herein, $P_{S\text{-}SSB,K}$ is the $K^{th}$ optional power value.

Further, $P'_{S\text{-}SSB}$ satisfies a formula (7) and a formula (8), as shown below:

$$P'_{S\text{-}SB} \leq P_{S\text{-}SSB,MAX} \quad (7)$$

Herein, $P_{S\text{-}SSB,MAX}$ is a maximum transmit power of the S-SSB. In some implementations, the maximum transmit power of the S-SSB may be understood as a maximum transmit power limited by physical hardware of the first terminal device, or may be understood as a maximum transmit power allowed by hardware of the first terminal device. Alternatively, the maximum transmit power of the S-SSB may be obtained by the first terminal device through calculation based on a parameter configured by the base station. A manner of calculating the maximum transmit power of the S-SSB is not limited in this embodiment of this application.

$$P'_{S\text{-}SSB} \leq P_{O\_SSB,DL} + \alpha_{S\text{-}SSB,DL} \times PL_{DL} \quad (8)$$

Herein, PS-SSB is the transmit power of the S-SSB. $P'_{S\text{-}SSB}$ is the first value. $P_{O\_SSB,DL}$ is a target receive power of the S-SSB, and this value may be configured by the base station. $PL_{DL}$ is the path loss estimate between the base station and the first terminal device. $\alpha_{S\text{-}SSB,DL}$ is a path loss compensation factor of the S-SSB, and this value may be configured by the base station.

Optionally, in this embodiment, the transmit power may not be specified on an S-SSB basis, but transmit powers of the PSSS, the SSSS, and the PSBCH are separately set.

Therefore, the transmit powers of the PSSS, the SSSS, and the PSBCH may respectively satisfy the following formulas:

$$P_{PSSS}=P'_{S\text{-}SSB} \quad (9)$$

$$P_{SSSS}=P'_{S\text{-}SSB} \quad (10)$$

$$P_{PSBCH}=P'_{S\text{-}SSB} \quad (11)$$

Herein, $P_{SSSS}$ is the transmit power of the PSSS, $P_{SSSS}$ is the transmit power of the SSSS, $P_{PSBCH}$ is the transmit power of the PSBCH, and $P'_{S\text{-}SSB}$ is the first value.

Specifically, $P'_{S\text{-}SSB}$ not only satisfies the formula (6), but also satisfies the following formulas:

$$P'_{S\text{-}SSB} \leq \min(P_{PSSS,MAX}, P_{SSSS,MAX}, P_{PSBCH,MAX}) \quad (12)$$

$$P'_{S\text{-}SSB} \leq \min(P_{O\_PSSS,DL}+\alpha_{PSSS,DL}\times PL_{DL}, P_{O\_SSSS,DL}+\alpha_{SSSS,DL}\times PL_{DL}, P_{O\_PSBCH,DL}+\alpha_{PSCBCH,DL}\times PL_{DL}) \quad (13)$$

Herein, $P_{PSSS,MAX}$, $P_{SSSS,MAX}$, and $P_{PSBCH,MAX}$ are respectively maximum transmit powers of the PSSS, the SSSS, and the PSBCH. $P_{O\_PSSS,DL}$ is a target receive power (that is, a target power) of the PSSS, $P_{O\_SSSS,DL}$ is a target receive power of the SSSS, and $P_{O\_PSBCH,DL}$ is a target receive power of the PSBCH. $PL_{DL}$ is the path loss estimate between the base station and the first terminal device, $\alpha_{PSSS,DL}$ is a path loss compensation factor of the PSSS, $\alpha_{SSSS,DL}$ is a path loss compensation factor of the SSSS, and $\alpha_{PSBCH,DL}$ is a path loss compensation factor of the PSBCH. It may be understood that, in this embodiment of this application, path loss compensation factors or target receive powers of different signals or channels are represented as different parameters. In specific implementation, the path loss compensation factors of the PSSS, the SSSS, and the PSBCH may alternatively be a same parameter (or this may be understood as $\alpha_{PSSS,DL}=\alpha_{SSSS,DL}=\alpha_{PSBCH,DL}$), and the target receive powers of the PSSS, the SSSS, and the PSBCH may alternatively be a same parameter (or this may be understood as $P_{O\_PSSS,DL}=P_{O\_SSSS,DL}=P_{O\_DSBCH,D}$). Therefore, the formulas shown in this embodiment of this application should not be understood as a limitation on this embodiment of this application.

In this embodiment, the transmit power of the first signal, namely, the S-SSB, is the power value corresponding to the first value. For example, the transmit power of the SSSB is equal to the power value corresponding to the first value.

Further, in this embodiment, the indication information sent by the first terminal device to the second terminal device may include at least one of the following:

(1) load information of the PSBCH; and (2) a demodulation reference signal (demodulation reference signal, DMRS) sequence of the PSBCH.

In other words, the indication information may be determined based on not only the load information of the PSBCH, but also the DMRS sequence of the PSBCH. Specifically, for example, the indication information may include the load information of the PSBCH. To be specific, the first terminal device may use the load information of the PSBCH to indicate or include the first value. For example, the first terminal device may indicate the first value by using [log$_2$ (K)] bits. For example, when K=8, the first value may be indicated by using 3-bit information in the load information of the PSBCH. For another example, the indication information may alternatively include the DMRS sequence of the PSBCH. To be specific, the first terminal device may alternatively use the DMRS sequence of the PSBCH to indicate the first value. For example, if there are K optional DMRS sequences of the PSBCH, the K optional sequences may correspond to the K optional power values. In other words, each optional sequence one-to-one corresponds to each optional power value. In this case, when receiving the PSBCH, the second terminal device may separately blindly detect the K optional sequences, to determine the DMRS sequence, so that the first value can be determined. For another example, the indication information may be included in both the load information of the PSBCH and the DMRS sequence. In other words, the first terminal device may alternatively use the load information of the PSBCH and the DMRS sequence of the PSBCH to indicate the first value. For example, K=8, and there are two optional DMRS sequences of the PSBCH. In this case, the eight optional power values may be classified into two groups, and each group corresponds to one optional DMRS sequence. In addition, 2-bit information in the load information of the PSBCH is used to indicate one of four optional power values in each group.

It may be understood that, in specific implementation, there may be some errors. For example, K=4, and the K optional power values are respectively {16 dBm, 18 dBm, 20 dBm, and 22 dBm}, but the transmit power determined by the first terminal device is 20.31 dBm. In this case, the indication information may indicate the first value, that is, 20 dBm (that is, 2-bit information in the indication information may be used to indicate 20 dBm). To be specific, the indication information is determined based on the first value, and the transmit power that is of the S-SSB and that is finally determined by the first terminal device is 20 dBm. Optionally, the first terminal device may alternatively transmit the S-SSB at 20.31 dBm, and 10-bit information in the indication information may be used to indicate 20.31 dBm. In this case, 20.31 dBm is also one of the K optional power values, and K is less than or equal to 1024 (that is, 2 raised to the power of 10). The foregoing specific implementation is not limited in this embodiment of this application.

In this embodiment, the first terminal device ensures that the transmit powers of the PSSS, the SSSS, and the PSBCH are the same, so that transmit powers on the four OFDM symbols used by the first terminal device to transmit the S-SSB can be kept constant (that is, for the first terminal device, an amplification multiple of a power amplifier is easy to determine). This helps ensure stability of the transmit power of the first terminal device.

In some embodiments of this application, when not all of the transmit powers on the first OFDM symbol, the second OFDM symbol, and the third OFDM symbol are the same, the transmit power of the S-SSB may satisfy the following formulas:

$$P_{PSSS}=P'_{S\text{-}SSB}+A \quad (14)$$

$$P_{SSSS}=P'_{S\text{-}SSB}+B \quad (15)$$

$$P_{PSBCH}=P'_{S\text{-}SSB}+C \quad (16)$$

Herein, $P'_{S\text{-}SSB}$ not only satisfies the formula (6), but also satisfies the following formulas:

$$P'_{S\text{-}SSB} \leq \min(P_{PSSS,MAX}-A, P_{SSSS,MAX}-B, P_{PSBCH,MAX}-C) \quad (17)$$

$$P'_{S\text{-}SSB} \leq \min(P_{O\_PSBCH,DL}+\alpha_{PSBCH,DL}\times PL_{DL}-A, P_{O\_SSSS,DL}+\alpha_{SSSS,DL}\times PL_D-B, P_{O\_PSBCH,DL}+\alpha_{PSBCH,DL}\times PL_{DL}-C) \quad (18)$$

Herein, A, B, and C represent power offset values, which may be alternatively referred to as offset (offset) values. Optionally, A, B, and C may be predefined, or may be determined by the first terminal device. It may be understood that, in this embodiment, the transmit power of the first signal, namely, the S-SSB, is the sum of the power value corresponding to the first value and the power offset value. It may be understood that for detailed descriptions of other parameters in the formula (14) to the formula (18), refer to the detailed descriptions of the formula (9) to the formula (13). Details are not described herein again.

When A, B, and C are predefined, both the first terminal device and the second terminal device know the values. If A=3 and B=C=0, it may indicate that the power of the PSSS is 3 dB higher than that of the SSSS (or the PSBCH), and the power of the SSSS is equal to that of the PSBCH. Detection precision of the PSSS may be improved by increasing the transmit power of the PSSS, thereby increasing a probability that the first terminal device is detected.

It may be understood that, when A, B, and C are predefined, an indication manner of the indication information may be, for example, using the load information of the PSBCH for indication, or using the DMRS sequence of the PSBCH for indication. For detailed descriptions thereof, refer to the foregoing embodiment. Details are not described herein again.

When A, B, and C are determined by the first terminal device, the first terminal device may use a power difference between at least two of the PSBCH, the PSSS, and the SSSS to indicate the first value. In other words, in this case, indication by the indication information may be implemented by using the power difference between the at least two of the PSBCH, the PSSS, and the SSSS. Further, there is a mapping relationship between the first value and the power difference, that is, there is a one-to-one correspondence between the first value and the power difference. Optionally, the mapping relationship may be configured by the base station, may be predefined, or may be determined by the higher layer of the first terminal device.

For example, the first terminal device may use a power difference between the PSSS, the SSSS, and the PSBCH to indicate the first value. For example, if K=4 (k=0 to 3), when the transmit power of the PSBCH is 3×k dB lower than the transmit power of the PSSS, the corresponding transmit power of the PSSS may be the $k^{th}$ optional value. For example, optional values for the transmit power of the PSSS are 14 dBm, 16 dBm, 18 dBm, and 20 dBm. When the first terminal device sets the transmit power of the PSSS to 18 dBm (correspondingly, k=2), the transmit power of the PSBCH is 3×k=3×2=6 dB lower than the transmit power of the PSSS. In other words, the transmit power of the PSBCH is 12 dBm. When receiving the S-SSB, the second terminal device may determine, by comparing receive powers, that a power difference between the received PSSS and PSBCH is 6 dB, so as to learn that one of the four optional values that corresponds to k=6/3=2, that is, 18 dBm, is determined by the first terminal device. Further, the second terminal device may determine that the transmit power of the PSBCH is 12 dBm.

For another example, if K=4, when the transmit power of the SSSS is equal to the transmit power of the PSBCH, correspondingly, k=0/1; or when the transmit power of the SSSS is 3 dB higher than the transmit power of the PSBCH, correspondingly, k=2/3. Then, whether the power of the PSSS is equal to or 3 dB higher than that of the SSSS is determined through comparison, so that one of two optional power values may be determined. For example, optional values for the transmit power of the PSSS are 14 dBm, 16 dBm, 18 dBm, and 20 dBm. When the first terminal device sets the transmit power of the PSSS to 14 dBm (correspondingly, k=0), the transmit power of the PSBCH is equal to the transmit power of the PSSS, and the transmit power of the PSSS is equal to the transmit power of the SSSS. When the first terminal device sets the transmit power of the PSSS to 16 dBm (correspondingly, k=1), the transmit power of the PSBCH is equal to the transmit power of the PSSS, and the transmit power of the PSSS is 3 dB higher than the transmit power of the SSSS. When the first terminal device sets the transmit power of the PSSS to 18 dBm (correspondingly, k=2), the transmit power of the PSBCH is 3 dB higher than the transmit power of the PSSS, and the transmit power of the PSSS is equal to the transmit power of the SSSS. When the first terminal device sets the transmit power of the PSSS to 20 dBm (correspondingly, k=3), the transmit power of the PSBCH is 3 dB higher than the transmit power of the PSSS, and the transmit power of the PSSS is 3 dB higher than the transmit power of the SSSS.

For another example, the first terminal device may alternatively use load information of the PSBCH and a DMRS sequence of the PSBCH to indicate the first value. For example, if K=8, and corresponds to 3-bit information, the first terminal device may use a difference between the transmit power of the PSBCH and the transmit power of the PSSS (the two transmit powers are equal or the former is 3 dB higher than the latter) to indicate i-bit information, and the remaining 2 bits may be indicated by using the load information of the PSBCH and/or the DMRS sequence of the PSBCH.

Optionally, when not all of the transmit powers on the first OFDM symbol, the second OFDM symbol, and the third OFDM symbol are the same, the transmit power of the S-SSB may further satisfy the following formulas:

$$P_{PSSS} = P'_{S-SSB} + 10\log_{10}\left(\frac{M_{PSSS}}{M_{S-SSB}}\right) \tag{19}$$

$$P_{SSSS} = P'_{S-SSB} + 10\log_{10}\left(\frac{M_{SSSS}}{M_{S-SSB}}\right) \tag{20}$$

$$P_{PSBCH} = P'_{S-SSB} + 10\log_{10}\left(\frac{M_{PSBCH}}{M_{S-SSB}}\right) \tag{21}$$

Herein, $P'_{S-SSB}$ not only satisfies the formula (6), but also satisfies the following formulas:

$$P'_{S-SSB} \leq \min\left[P_{PSSS,MAX} - 10\log_{10}\left(\frac{M_{PSSS}}{M_{S-SSB}}\right), \right. \tag{22}$$

$$P_{SSSS,MAX} - 10\log_{10}\left(\frac{M_{SSSS}}{M_{S-SSB}}\right), P_{PSBCH,MAX} - 10\log_{10}\left(\frac{M_{PSBCH}}{M_{S-SSB}}\right)\right]$$

$$P'_{S-SSB} \leq \min\left[P_{O\_PSSS,DL} + \alpha_{PSSS,DL} \times PL_{DL} - 10\log_{10}\left(\frac{M_{PSSS}}{M_{S-SSB}}\right), \right. \tag{23}$$

$$P_{O\_SSSS,DL} + \alpha_{SSSS,DL} \times PL_{DL} - 10\log_{10}\left(\frac{M_{SSSS}}{M_{S-SSB}}\right),$$

$$\left. P_{O\_PSBCH,DL} + \alpha_{PSBCH,DL} \times PL_{DL} - 10\log_{10}\left(\frac{M_{PSBCH}}{M_{S-SSB}}\right)\right]$$

Herein, $M_{PSSSS}$ is bandwidth of the PSSS, $M_{SSSS}$ is bandwidth of the PSSS, $M_{PSBCH}$ is bandwidth of the PSBCH, and MS-SSB is bandwidth of the S-SSB. It may be understood that for descriptions of other parameters in the formula (19) to the formula (23), refer to the foregoing embodiment. Details are not described herein again. It may be understood that, in this embodiment of this application, $M_{SSSS}$ may be specifically understood as a quantity of resource blocks (resource block, RB) or resource elements (resource element, RE) occupied by the PSSS on a frequency domain resource, $M_{SSSS}$ may be understood as a quantity of RBs or REs occupied by the SSSS in frequency domain, and $M_{PSBCH}$ may be understood as a quantity of RBs or REs occupied by the PSBCH in frequency domain.

In this embodiment, it may be understood that all resource blocks (resource block, RB) or all resource elements (resource element, RE) occupied by the PSSS, the SSSS, and the PSBCH included in the S-SSB have a same transmit power.

It may be understood that, in this embodiment, for an indication manner of the indication information, refer to the foregoing embodiment. Details are not described herein again. For example, load information of the PSBCH may be used for indication, or a DMRS sequence of the PSBCH may be used for indication. In other words, in this embodiment, the indication information may include one or more of the load information of the PSBCH and the DMRS sequence of the PSBCH.

Optionally, the first value may alternatively indicate a transmit power on a first RE or a first RB of the first OFDM symbol on which the S-SSB is located. As shown in FIG. 5a, REs or RBs of the first OFDM symbol on which the S-SSB is located may not only include the first RE or the first RB, but also include a second RE or a second RB. Therefore, the first RE or the first RB shown in this embodiment is merely an example, and should not be construed as a limitation on this embodiment.

When the first value indicates the transmit power on the first RE or the first RB of the first OFDM symbol on which the S-SSB is located, in this embodiment of this application, the following implementations may be further provided based on whether transmit powers on the first OFDM symbol, the second OFDM symbol, and the third OFDM symbol are the same.

In some embodiments of this application, when the transmit powers on the first OFDM symbol, the second OFDM symbol, and the third OFDM symbol are the same, the transmit power of the S-SSB may satisfy the following formula:

$$P_{S-SSB} = 10 \log_{10}(2^{\mu} \times M_{S-SSB}) + P'_{S-SSB} \quad (24)$$

Herein, $P'_{S-SSB}$ not only satisfies the formula (6), but also satisfies the following formulas:

$$P'_{S-SSB} \leq P_{S-SSB,MAX} - 10 \log_{10}(2^{\mu} \times M_{S-SSB}) \quad (25)$$

$$P'_{S-SSB} \leq P_{O\_S-SSB,DL} + \alpha_{S-SSB,DL} \times PL_{DL} \quad (26)$$

In this embodiment, PS-SSB is the transmit power of the S-SSB, $P'_{S-SSB}$ is the first value, $M_{S-SSB}$ is bandwidth of the S-SSB, $P_{S-SSB,MAX}$ is a maximum transmit power of the S-SSB, $P_{O\_S-SSB,DL}$ is a target receive power of one RB or one RE, and $\alpha_{S-SSB,DL}$ is a path loss compensation factor of the S-SSB. It may be understood that a value of µ in the formula (24) and the formula (25) may be determined based on a subcarrier spacing. $M_{S-SSB}$ may be understood as a quantity of RBs or REs occupied by the S-SSB in frequency domain.

Optionally, in this embodiment, the transmit power may not be specified on an S-SSB basis, but transmit powers of the PSSS, the SSSS, and the PSBCH are separately set. Therefore, the transmit powers of the PSSS, the SSSS, and the PSBCH may respectively satisfy the following formulas:

$$P_{PSSS} = 10 \log_{10}(2^{\mu} \times M_{S-SSB}) + P'_{S-SSB} \quad (27)$$

$$P_{SSSS} = 10 \log_{10}(2^{\mu} \times M_{S-SSB}) + P'_{S-SSB} \quad (28)$$

$$P_{PSBCH} = 10 \log_{10}(2^{\mu} \times M_{S-SSB}) + P'_{S-SSB} \quad (29)$$

Herein, $P'_{S-SSB}$ not only satisfies the formula (6), but also satisfies the following formulas:

$$P'_{S-SSB} \leq \quad (30)$$

$$\min(P_{PSSS,MAX}, P_{SSSS,MAX}, P_{PSBCH,MAX}) - 10\log_{10}(2^{\mu} \times M_{S-SSB})$$

$$P'_{S-SSB} \leq \min\left[P_{O\_PSSS,DL} + \alpha_{PSSS,DL} \times PL_{DL} - 10\log_{10}\left(\frac{M_{PSSS}}{M_{S-SSB}}\right),\right. \quad (31)$$

$$P_{O\_SSSS,DL} + \alpha_{SSSS,DL} \times PL_{DL} - 10\log_{10}\left(\frac{M_{SSSS}}{M_{S-SSB}}\right),$$

$$\left. P_{O\_PSBCH,DL} + \alpha_{PSBCH,DL} \times PL_{DL} - 10\log_{10}\left(\frac{M_{PSBCH}}{M_{S-SSB}}\right)\right]$$

It may be understood that for specific descriptions of the foregoing parameters, refer to the foregoing embodiment. Details are not described herein again.

It may be understood that, in this embodiment, because the first value indicates the transmit power on the RE or the RB, the first value may be understood as a reference value for determining the transmit power of the S-SSB at a granularity of RE or RB. For example, for the PSSS, a power value on each RE or RB is $$P'_{S-SSB} - 10\log_{10}\left(\frac{M_{PSSS}}{M_{S-SSB}}\right).$$

For the SSSS, a power value on each RE or RB is $$P'_{S-SSB} - 10\log_{10}\left(\frac{M_{SSSS}}{M_{S-SSB}}\right).$$

For the PSBCH, a power value on each RE or RB is $$P'_{S-SSB} - 10\log_{10}\left(\frac{M_{PSBCH}}{M_{S-SSB}}\right).$$

In this embodiment, the transmit power of the first signal, namely, the S-SSB, is the power value corresponding to the first value.

It may be understood that, for an indication manner of the indication information, refer to the foregoing embodiment. Details are not described herein again. For example, the indication information may include one or more of load information of the PSBCH and a DMRS sequence of the PSBCH.

In some embodiments of this application, when not all of the transmit powers on the first OFDM symbol, the second OFDM symbol, and the third OFDM symbol are the same, the transmit power of the S-SSB may satisfy the following formulas:

$$P_{SSSS} = 10 \log_{10}(2^{\mu} \times M_{S-SSB}) + P'_{S-SSB} + A \quad (32)$$

$$P_{SSSS} = 10 \log_{10}(2\mu \times M_{S-SSB}) + P'_{S-SSB} + B \quad (33)$$

$$P_{PSBCH} = 10 \log_{10}(2^{\mu} \times M_{S-SSB}) + P'_{S-SSB} + C \quad (34)$$

Herein, P'$_{S-SSB}$ not only satisfies the formula (6), but also satisfies the following formulas:

$$P'_{S-SSB} \leq \min(P_{PSSS,MAX} - A, P_{SSSS,MAX} - B, P_{PSBCH,MAX} - C) - \quad (35)$$
$$10\log_{10}(2^\mu \times M_{S-SSB})$$

$$P'_{S-SSB} \leq \min\left[P_{O\_PSSS,DL} + \alpha_{PSSS,DL} \times PL_{DL} + 10\log_{10}\left(\frac{M_{PSSS}}{M_{S-SSB}}\right) - A, \quad (36)\right.$$
$$P_{O\_SSSS,DL} + \alpha_{SSSS,DL} \times PL_{DL} + 10\log_{10}\left(\frac{M_{SSSS}}{M_{S-SSB}}\right) - B,$$
$$\left.P_{O\_PSBCH,DL} + \alpha_{PSBCH,DL} \times PL_{DL} + 10\log_{10}\left(\frac{M_{PSBCH}}{M_{S-SSB}}\right) - C\right]$$

In this embodiment, A, B, and C represent power offset values, which may be alternatively referred to as offset (offset) values. Optionally, A, B, and C may be predefined, or may be determined by the first terminal device. It may be understood that, in this embodiment, the transmit power of the first signal, namely, the S-SSB, is the sum of the power value corresponding to the first value and the power offset value. In this embodiment, when A, B, and C are predefined, the indication information may include one or more of load information of the PSBCH and a DMRS sequence of the PSBCH. When A, B, and C are determined by the first terminal device, the indication information may include a power difference between at least two of the PSBCH, the PSSS, and the SSSS.

It may be understood that, in this embodiment, P'$_{S-SSB}$ does not represent a power value of each signal or channel (such as the PSBCH, the PSSS, or the SSSS) on each RE or RB, but represents a reference value for determining a transmit power. It may be understood that for specific descriptions of the parameters, refer to the foregoing embodiment. Details are not described herein again.

Optionally, when not all of the transmit powers on the first OFDM symbol, the second OFDM symbol, and the third OFDM symbol are the same, the transmit power of the S-SSB may further satisfy the following formulas:

$$P_{PSSS} = P'_{S-SSB} + 10\log_{10}(2^\mu \times M_{PSSS}) \quad (37)$$

$$P_{SSSS} = P'_{S-SSB} + 10\log_{10}(2^\mu \times M_{SSSS}) \quad (38)$$

$$P_{PSBCH} = P'_{S-SSB} + 10\log_{10}(2^\mu \times M_{PSBCH}) \quad (39)$$

Herein, P'$_{S-SSB}$ not only satisfies the formula (6), but also satisfies the following formulas:

$$P'_{S-SSB} \leq \min[P_{PSSS,MAX} - 10\log_{10}(2^\mu \times M_{SSSS}),$$
$$P_{SSSS,MAX} - 10\log_{10}(2^\mu \times M_{PSSS}), P_{SBCH,MAX} -$$
$$10\log_{10}(2^\mu \times M_{PSBCH})] \quad (40)$$

$$P'_{S-SSB} \leq \min(P_{O\_PSSS,DL} + \alpha_{PSSS,DL} \times PL_{DL}, P_{O\_SSSS,DL} + \alpha_{SSSS,DL} \times PL_{DL}, P_{O\_PSBCH,DL} + \alpha_{PSBCH,DL} \times PL_{DL}) \quad (41)$$

In this embodiment, it may be understood that transmit powers of all RBs or REs on the four symbols occupied by the S-SSB are the same. In this embodiment, the transmit power of the first signal, namely, the S-SSB, is the power value corresponding to the first value. In addition, in this embodiment, the indication information may include one or more of load information of the PSBCH and a DMRS sequence of the PSBCH. For specific descriptions of the indication information, refer to the foregoing embodiment. Details are not described herein again.

It may be understood that for specific descriptions of the parameters, refer to the foregoing embodiment. Details are not described herein again.

Figure 5B:
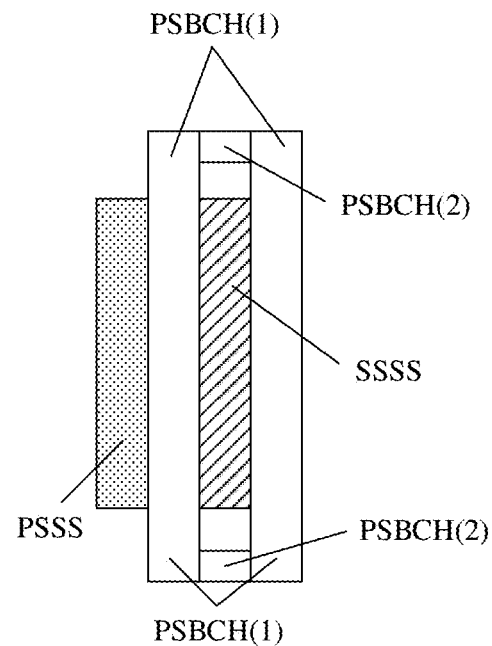
FIG. 5b is a schematic structural diagram of another S-SSB according to an embodiment of this application.

The foregoing embodiments are shown in the structure of the S-SSB shown in FIG. 5a. In specific implementation, the S-SSB may alternatively include another structure. FIG. 5b is a schematic structural diagram of another S-SSB according to an embodiment of this application. As shown in FIG. 5b, the S-SSB may occupy four OFDM symbols in time domain. A difference from FIG. 5a lies in that an SSSS and a PSBCH occupy one OFDM symbol at the same time. As shown in FIG. 5b, the OFDM symbols occupied by the S-SSB may also be classified into a first OFDM symbol, a second OFDM symbol, a third OFDM symbol, and a fourth OFDM symbol. For example, an OFDM symbol occupied by a PSSS may be referred to as the first OFDM symbol, an OFDM symbol occupied by the SSSS and a PSBCH(2) may be referred to as the second OFDM symbol, and two OFDM symbols occupied by a PSBCH(1) may be respectively referred to as the third OFDM symbol and the fourth OFDM symbol. It may be understood that the structure of the S-SSB shown in FIG. 5b is merely an example. In specific implementation, a bandwidth relationship among the PSSS, the PSBCH, and the SSSS is not limited in this embodiment of this application. For example, bandwidth of the PSSS and bandwidth of the SSSS may be the same or may be different.

Optionally, the first value may be used to indicate a transmit power on the first OFDM symbol on which the S-SSB is located. When the first value indicates the transmit power on the first OFDM symbol occupied by the S-SSB, in this embodiment of this application, the following implementations may be provided based on whether transmit powers on the first OFDM symbol, the second OFDM symbol, and the third OFDM symbol are the same.

In some embodiments of this application, when the transmit powers on the first OFDM symbol, the second OFDM symbol, and the third OFDM symbol are the same, the transmit power of the S-SSB may satisfy the following formulas:

$$P_{PSSS} = P'_{S-SSB} \quad (42)$$

$$P_{PSBCH(1)} = P'_{S-SSB} \quad (43)$$

$$P_{PSBCH(2)} = P'_{S-SSB} + 10\log_{10}\left(\frac{M_{PSBCH}}{M_{SSSS} + M_{PSBCH}}\right) \quad (44)$$

$$P_{SSSS} = P'_{S-SSB} + 10\log_{10}\left(\frac{M_{SSSS}}{M_{SSSS} + M_{PSBCH}}\right) \quad (45)$$

Herein, P$_{PSSS}$ is a transmit power of the PSSS, P$_{SSSS}$ is a transmit power of the SSSS, P$_{PSBCH(1)}$ is a transmit power of the PSBCH(1), P$_{PSBCH(2)}$ is a transmit power of the PSBCH (2), P'$_{S-SSB}$ is the first value, M$_{PSSS}$ is bandwidth of the PSSS, M$_{SSSS}$ is bandwidth of the PSSS, and M$_{PSBCH}$ is bandwidth of the PSBCH. In this embodiment, the transmit power of the first signal, namely, the S-SSB, is the power value corresponding to the first value.

For the formula (44) and the formula (45), the SSSS and the PSBCH(2) occupy the same OFDM symbol at the same time. Therefore, when the first terminal device needs to ensure that transmit powers of all OFDM symbols are the same, the first terminal device needs to perform power conversion on the SSSS and the PSBCH on the same OFDM symbol, and then determine respective transmit powers.

Herein, P'$_{S-SSB}$ not only satisfies the formula (6), but also satisfies the formula (12) and the formula (13).

Further, in this embodiment, the indication information sent by the first terminal device to the second terminal device may include at least one of the following:

(1) load information of the PSBCH; and (2) a demodulation reference signal (demodulation reference signal, DMRS) sequence of the PSBCH.

It may be understood that, for a specific implementation of an indication manner of the indication information, refer to the foregoing embodiment. Details are not described herein again.

In some embodiments of this application, when not all of the transmit powers on the first OFDM symbol, the second OFDM symbol, and the third OFDM symbol are the same, the transmit power of the SSSB may satisfy the following formulas:

$$P_{PSSS} = P'_{S-SSB} + A \quad (46)$$

$$P_{PSBCH(1)} = P'_{S-SSB} + B \quad (47)$$

$$P_{PSBCH(2)} = P'_{S-SSB} + 10\log_{10}\left(\frac{M_{PSBCH}}{M_{SSSS} + M_{PSBCH}}\right) + B \quad (48)$$

$$P_{SSSS} = P'_{S-SSB} + 10\log_{10}\left(\frac{M_{SSSS}}{M_{SSSS} + M_{PSBCH}}\right) + C \quad (49)$$

Herein, $P'_{S-SSB}$ not only satisfies the formula (6), but also satisfies the formula (17) and the formula (18).

Herein, A, B, and C represent power offset values, which may be alternatively referred to as offset (offset) values. Optionally, A, B, and C may be predefined, or may be determined by the first terminal device. It may be understood that, in this embodiment, the transmit power of the first signal, namely, the SSSB, is the sum of the power value corresponding to the first value and the power offset value.

It may be understood that for specific descriptions of other parameters in the formula (46) to the formula (49), refer to the foregoing embodiment. Details are not described herein again.

Optionally, when A, B, and C are predefined, an indication manner of the indication information may be, for example, using load information of the PSBCH for indication, or using a DMRS sequence of the PSBCH for indication. For detailed descriptions thereof, refer to the foregoing embodiment. Details are not described herein again.

When A, B, and C are determined by the first terminal device, the first terminal device may use a power difference between at least two of the PSBCH, the PSSS, and the SSSS to indicate the first value. In other words, in this case, indication by the indication information may be implemented by using the power difference between the at least two of the PSBCH, the PSSS, and the SSSS.

Optionally, when not all of the transmit powers on the first OFDM symbol, the second OFDM symbol, and the third OFDM symbol are the same, the transmit power of the S-SSB may further satisfy the following formulas:

$$P_{PSSS} = P'_{S-SSB} + 10\log_{10}\left(\frac{M_{PSSS}}{M_{S-SSB}}\right) \quad (50)$$

$$P_{PSBCH(1)} = P'_{S-SSB} + 10\log_{10}\left(\frac{M_{PSBCH}}{M_{S-SSB}}\right) \quad (51)$$

$$P_{PSBCH(2)} = P'_{S-SSB} + 10\log_{10}\left(\frac{M_{PSBCH}}{M_{SSSS} + M_{PSBCH}} \times \frac{M_{PSBCH}}{M_{S-SSB}}\right) \quad (52)$$

$$P_{SSSS} = P'_{S-SSB} + 10\log_{10}\left(\frac{M_{SSSS}}{M_{SSSS} + M_{PSBCH}} \times \frac{M_{SSSS}}{M_{S-SSB}}\right) \quad (53)$$

Herein, $P'_{S-SSB}$ not only satisfies the formula (6), but also satisfies the formula (22) and the formula (23).

In this embodiment, it may be understood that all resource blocks (resource block, RB) or all resource elements (resource element, RE) occupied by the PSSS, the SSSS, and the PSBCH included in the SSSB have a same transmit power.

It may be understood that, in this embodiment, for detailed descriptions of other parameters, refer to the formula (19) to the formula (23). Details are not described herein again. In addition, for an indication manner of the indication information, refer to the foregoing embodiment. Details are not described herein again. For example, load information of the PSBCH may be used for indication, or a DMRS sequence of the PSBCH may be used for indication.

Optionally, the first value may alternatively indicate a transmit power on a first RE or a first RB of the first OFDM symbol on which the SSSB is located. As shown in FIG. 5b, REs or RBs of the first OFDM symbol on which the S-SSB is located may not only include the first RE or the first RB, but also include a second RE or a second RB. Therefore, the first RE or the first RB shown in this embodiment is merely an example, and should not be construed as a limitation on this embodiment.

When the first value indicates the transmit power on the first RE or the first RB of the first OFDM symbol on which the SSSB is located, in this embodiment of this application, the following implementations may be further provided based on whether transmit powers on the first OFDM symbol, the second OFDM symbol, and the third OFDM symbol are the same.

In some embodiments of this application, when the transmit powers on the first OFDM symbol, the second OFDM symbol, and the third OFDM symbol are the same, the transmit power of the S-SSB may satisfy the following formulas:

$$P_{PSSS} = 10\log_{10}(2^{\mu} \times M_{S-SSB}) + P'_{S-SSB} \quad (54)$$

$$P_{PSBCH(1)} = 10\log_{10}(2^{\mu} \times M_{S-SSB}) + P'_{S-SSB} \quad (55)$$

$$P_{PSBCH(2)} = P'_{S-SSB} + 10\log_{10}\left(2^{\mu} \times \frac{M_{PSBCH} \times M_{S-SSB}}{M_{SSSS} + M_{PSBCH}}\right) \quad (56)$$

$$P_{SSSS} = P'_{S-SSB} + 10\log_{10}\left(2^{\mu} \times \frac{M_{SSSS} \times M_{S-SSB}}{M_{SSSS} + M_{PSBCH}}\right) \quad (57)$$

Herein, $P_{S-SSB}$ not only satisfies the formula (6), but also satisfies the formula (30) and the formula (31).

In this embodiment, the transmit power of the first signal, namely, the S-SSB, is the power value corresponding to the first value.

It may be understood that, for an indication manner of the indication information, refer to the foregoing embodiment. Details are not described herein again. For example, the indication information may include one or more of load information of the PSBCH and a DMRS sequence of the PSBCH.

It may be understood that for specific descriptions of the parameters in this embodiment, refer to the foregoing embodiment. Details are not described herein again.

In some embodiments of this application, when not all of the transmit powers on the first OFDM symbol, the second OFDM symbol, and the third OFDM symbol are the same, the transmit power of the S-SSB may satisfy the following formulas:

$$P_{PSSS} = 10\log_{10}(2^\mu \times M_{S-SSB}) + P'_{S-SSB} + A \quad (58)$$

$$P_{PSBCH(1)} = 10\log_{10}(2^\mu \times M_{S-SSB}) + P'_{S-SSB} + B \quad (59)$$

$$P_{PSBCH(2)} = P'_{S-SSB} + 10\log_{10}\left(2^\mu \times \frac{M_{PSBCH} \times M_{S-SSB}}{M_{SSSS} + M_{PSBCH}}\right) + B \quad (60)$$

$$P_{SSSS} = P'_{S-SSB} + 10\log_{10}\left(2^\mu \times \frac{M_{SSSS} \times M_{S-SSB}}{M_{SSSS} + M_{PSBCH}}\right) + C \quad (61)$$

Herein, $P'_{S-SSB}$ not only satisfies the formula (6), but also satisfies the formula (35) and the formula (36).

It may be understood that, for detailed descriptions of this embodiment, refer to the related descriptions of the formula (32) to the formula (36). Details are not described herein again.

Optionally, when not all of the transmit powers on the first OFDM symbol, the second OFDM symbol, and the third OFDM symbol are the same, the transmit power of the S-SSB may further satisfy the following formulas:

$$P_{PSSS} = P'_{S-SSB} + 10\log_{10}(2^\mu \times M_{PSSS}) \quad (62)$$

$$P_{PSBCH(1)} = P'_{S-SSB} + 10\log_{10}(2^\mu \times M_{PSBCH}) \quad (63)$$

$$P_{PSBCH(2)} = P'_{S-SSB} + 10\log_{10}\left(2^\mu \times \frac{M_{PSBCH} \times M_{PSBCH}}{M_{SSSS} + M_{PSBCH}}\right) \quad (64)$$

$$P_{SSSS} = P'_{S-SSB} + 10\log_{10}\left(2^\mu \times \frac{M_{SSSS} \times M_{SSSS}}{M_{SSSS} + M_{PSBCH}}\right) \quad (65)$$

Herein, $P'_{S-SSB}$ not only satisfies the formula (6), but also satisfies the formula (40) and the formula (41).

It may be understood that, for detailed descriptions of this embodiment, refer to the related descriptions of the formula (37) to the formula (41). Details are not described herein again.

Further, after determining the transmit power of the S-SSB in the foregoing specific implementation, the first terminal device may send the S-SSB and the indication information to the second terminal device based on the transmit power of the S-SSB. After receiving the S-SSB and the indication information, the second terminal device may determine the path loss estimate between the first terminal device and the second terminal device. Specifically, after the second terminal device determines the path loss estimate $PL_{SL}$ between the first terminal device and the second terminal device, the second terminal device may send the second signal to the first terminal device according to PLR. The following describes in detail a method in which the second terminal device determines the transmit power of the second signal.

In some embodiments of this application, for example, the second signal may include a physical sidelink shared channel (physical sidelink shared channel, PSSCH). In this case, a transmit power of the PSSCH may satisfy the following formula:

$$P_{SSCH} = \min[P_{PSSCH,MAX}, 10\log_{10}(2^\mu \times M_{PSSCH}) + P_{O\_PSSCH,1} + \alpha_{PSSCH,1} \times PL_{SL}] \quad (66)$$

Herein, $P_{PSSCH}$ is the transmit power of the PSSCH. $P_{PSSCH,MAX}$ is a maximum transmit power of the PSSCH. $M_{PSSCH}$ is bandwidth of the PSSCH. $P_{O\_PSSCH,1}$ is a target receive power of the PSSCH, and this value may be configured by the base station, may be predefined, or may be indicated through higher layer negotiation. $\alpha_{PSSCH,1}$ is a path loss compensation factor, and this value may be configured by the base station, may be predefined, or may be indicated through higher layer negotiation. $PL_{SL}$ is the path loss estimate between the first terminal device and the second terminal device.

Optionally, a transmit power of the PSSCH may alternatively satisfy the following formula:

$$P_{PSSCH} = \min[P_{PSSCH,MAX}, 10\log_{10}(2^\mu \times M_{PSSCH}) + P_{O\_PSSCH,1} + \alpha_{PSSCH,1} \times PL_{SL}, 10\log_{10}(2^\mu \times M_{PSSCH}) + P_{O\_PSSCH,2} + \alpha_{PSSCH,2} \times PL_{DL}] \quad (67)$$

Herein, $P_{O\_PSSCHH,1}$ is a target receive power of the PSSCH, and this value may be configured by the base station, may be indicated through higher layer negotiation, or may be predefined. $\alpha_{PSSCH,1}$ is a path loss factor, and this value may be configured by the base station, may be indicated through higher layer negotiation, or may be predefined. $PL_{SL}$ is the path loss estimate between the first terminal device and the second terminal device. $P_{O\_PSSCH,2}$ is a target receive power of the PSSCH, and this value may be configured by the base station. $\alpha_{PSSCH,2}$ is a path loss factor, and this value may be configured by the base station. $PL_{DL}$ is a path loss estimate between the base station and the second terminal device.

The transmit power of the PSCCH may be further restricted by determining the transmit power of the PSCCH according to the formula (67), so that interference to an uplink signal is avoided, and transmission reliability is ensured.

Optionally, a transmit power of the PSSCH may alternatively satisfy the following formula:

$$P_{PSSCH} = \min(P_{PSSCH,MAX}, 10\log_{10}(2^\mu \times M_{PSSCH}) + P_{O\_PSSCH,1} + \alpha_{PSSCH,1} \times PL_{SL} + f_{PSSCH}) \quad (68)$$

Herein, $f_{PSSCH}$ is an adjustment parameter, and may be indicated by the base station through DCI, or may be indicated by the second terminal device. It may be understood that, in this embodiment, closed-loop power control is used to determine the transmit power of the second signal. For specific descriptions of other parameters in the formula (68), refer to the foregoing embodiment. Details are not described herein again.

Optionally, a transmit power of the PSSCH may alternatively satisfy the following formula:

$$P_{PSSCH} = \min(P_{PSCCH,MAX}, 10\log_{10}(2^\mu \times M_{PSSCH}) + P_{O\_PSSCH,1} + \alpha_{PSSCH,1} \times PL_{SL} + 10\log_{10}(2^\mu \times M_{PSSCH}) + P_{O\_PSSCH,2} + \alpha_{PSSCH,2} \times PL_{DL} + f_{PSSCH}) \quad (69)$$

In this embodiment, not only the closed-loop power control is used to determine the transmit power of the second signal, but also the path loss estimate between the base station and the second terminal device is used to determine the transmit power of the second signal. The transmit power of the second signal is further determined based on the path loss estimate on the sidelink, so that interference to an uplink signal is avoided, and signal transmission reliability is ensured.

In some embodiments of this application, for example, the second signal may alternatively include a physical sidelink control channel (physical sidelink control channel, PSCCH). In this case, a transmit power of the PSCCH may satisfy the following formula:

$$P_{PSCCH} = \min(P_{PSCCH,MAX}, 10\log_{10}(2^\mu \times M_{PSCCH}) + P_{O\_PSCCH,1} + \alpha_{PSCCH,1} \times PL_{SL}) \quad (70)$$

Herein, $P_{PSCCH}$ is the transmit power of the PSCCH. $P_{PSCCH,MAX}$ is a maximum transmit power of the PSCCH. $M_{PSCCH}$ is bandwidth of the PSCCH. $P_{O\_PSCCH,1}$ is a target receive power of the PSCCH, and this value may be configured by the base station, may be predefined, or may be indicated through higher layer negotiation. $\alpha_{PSCCH,1}$ is a path loss compensation factor, and this value may be configured by the base station, may be predefined, or may be indicated through higher layer negotiation. $PL_{SL}$ is the path loss estimate between the first terminal device and the second terminal device.

Optionally, a transmit power of the PSCCH may alternatively satisfy the following formula:

$$P_{PSCCH}=\min(P_{PSCCH,MAX}, 10 \log_{10}(2^{\mu} \times M_{PSCCH}) + P_{O\_PSCCH,1} + \alpha_{PSCCH,1} \times PL_{SL}, 10 \log_{10}(2^{\mu} \times M_{PSCCH}) + P_{O\_PSCCH,2} + \alpha_{PSCCH,2} \times PL_{DL}) \quad (71)$$

Herein, $P_{O\_PSCCH,1}$ is a target receive power of the PSCCH, and this value may be configured by the base station, may be indicated through higher layer negotiation, or may be predefined. $\alpha_{PSCCH,1}$ is a path loss factor, and this value may be configured by the base station, may be indicated through higher layer negotiation, or may be predefined. $PL_{SL}$ is the path loss estimate between the first terminal device and the second terminal device. $P_{O\_PSCCH,2}$ is a target receive power of the PSCCH, and this value may be configured by the base station. $\alpha_{PSCCH,2}$ is a path loss factor, and this value may be configured by the base station. $PL_{DL}$ is a path loss estimate between the base station and the second terminal device.

Optionally, a transmit power of the PSCCH may alternatively satisfy the following formula:

$$P_{PSCCH}=\min(P_{PSCCH,MAX}, 10 \log_{10}(2^{\mu} \times M_{PSCCH}) + P_{O\_PSCCH,1} + \alpha_{PSCCH,1} \times PL_{SL} + f_{PSCCH}) \quad (72)$$

Herein, $f_{PSCCH}$ is an adjustment parameter, and may be indicated by the base station through DCI, or may be indicated by the second terminal device. It may be understood that, in this embodiment, closed-loop power control is used to determine the transmit power of the second signal. For specific descriptions of other parameters in the formula (72), refer to the foregoing embodiment. Details are not described herein again.

Optionally, a transmit power of the PSCCH may alternatively satisfy the following formula:

$$P_{PSCCH} \min[P_{PSCCH,MAX}, 10 \log_{10}(2^{\mu} \times M_{PSCCH}) + P_{O\_PSCCH,1} + \alpha_{PSCCH,1} \times PL_{SL}, 10 \log_{10}(2^{\mu 2} \times M_{PSCCH}) + P_{O\_PSCCH,2} + \alpha_{PSCCH,2} \times PL_{DL} + f_{PSCCH}] \quad (73)$$

It may be understood that, for a specific implementation of the PSCCH, refer to the description in the foregoing embodiment. Details are not described herein.

In some embodiments of this application, for example, the second signal may alternatively include a physical sidelink feedback channel (physical sidelink feedback channel, PSFCH). It may be understood that, in specific implementation, the PSFCH may alternatively have another name. Therefore, a name of the PSFCH is not uniquely limited in this embodiment of this application. In this case, a transmit power of the PSFCH may satisfy the following formula:

$$P_{PSFCH}=\min(P_{PSFCH,MAX}, 10 \log_{10}(2^{\mu} \times M_{PSFCH}) + P_{O\_PSFCH,1} + \alpha_{PSFCH,1} \times PL_{SL}) \quad (74)$$

Herein, $P_{PSFCH}$ is the transmit power of the PSFCH. $P_{PSFCH,MAX}$ is a maximum transmit power of the PSFCH. $M_{PSFCH}$ is bandwidth of the PSFCH. $P_{O\_PSFCH,1}$ is a target receive power of the PSFCH, and this value may be configured by the base station, may be predefined, or may be indicated through higher layer negotiation. $\alpha_{PSFCH,1}$ is a path loss compensation factor, and this value may be configured by the base station, may be predefined, or may be indicated through higher layer negotiation. $PL_{SL}$ is the path loss estimate between the first terminal device and the second terminal device.

Optionally, a transmit power of the PSFCH may alternatively satisfy the following formula:

$$P_{PSFCH}=\min(P_{PSFCH,MAX}, 10 \log_{10}(2^{\mu} \times M_{PSFCH}), P_{O\_PSFCH,1} + \alpha_{PSFCH,1} \times PL_{SL}, 10 \log_{10}(2^{\mu} \times M_{PSFCH}) + P_{O\_PSFCH,2} + \alpha_{PSFCH,2} \times PL_{DL}) \quad (75)$$

Herein, $P_{O\_PSFCH,1}$ is a target receive power of the PSFCH, and this value may be configured by the base station, may be indicated through higher layer negotiation, or may be predefined. $\alpha_{PSFCH,1}$ is a path loss factor, and this value may be configured by the base station, may be indicated through higher layer negotiation, or may be predefined. $PL_{SL}$ is the path loss estimate between the first terminal device and the second terminal device. $P_{O\_PFSCH,2}$ is a target receive power of the PSFCH, and this value may be configured by the base station. $\alpha_{PSFCH,2}$ is a path loss factor, and this value may be configured by the base station. $PL_{DL}$ is a path loss estimate between the base station and the second terminal device.

Optionally, a transmit power of the PSFCH may alternatively satisfy the following formula:

$$P_{PSFCH}=\min(P_{PSFCH,MAX}, 10 \log_{10}(2^{\mu} \times M_{PSFCH}) + P_{O\_PSFCH,1} + \alpha_{PSFCH,1} \times PL_{SL} + f_{PSFCH}) \quad (76)$$

Herein, $f_{PSFCH}$ is an adjustment parameter, and may be indicated by the base station through DCI, or may be indicated by the second terminal device. It may be understood that, in this embodiment, closed-loop power control is used to determine the transmit power of the second signal. For specific descriptions of other parameters in the formula (76), refer to the foregoing embodiment. Details are not described herein again.

Optionally, a transmit power of the PSFCH may alternatively satisfy the following formula:

$$P_{PSFCH}=\min(P_{PSFCH,MAX}, 10 \log_{10}(2^{\mu} \times M_{PSFCH} + P_{O\_PSFCH,1} + \alpha_{PSFCH,1} \times PL_{SL}, 10 \log_{10}(2^{\mu} \times M_{PSFCH}) + P_{O\_PSFCH,2} + \alpha_{PSFCH,2} \times PL_{DL} + f_{PSFCH}) \quad (77)$$

It may be understood that, for a specific implementation of the PSFCH, refer to the description in the foregoing embodiment. Details are not described herein.

In some embodiments of this application, for example, the second signal may alternatively include a physical sidelink discovery channel (physical sidelink discovery channel, PSDCH). In this case, a transmit power of the PSDCH may satisfy the following formula:

$$P_{PSDCH}=\min(P_{PSDCH,MAX}, 10 \log_{10}(2^{\mu} \times M_{PSDCH}) + P_{O\_PSDCH,1} + \alpha_{PSDCH,1} \times PL_{SL}) \quad (78)$$

Herein, $P_{PSDCH}$ is the transmit power of the PSDCH. $P_{PSDCH,MAX}$ is a maximum transmit power of the PSDCH. $M_{PSDCH}$ is bandwidth of the PSDCH. $P_{O\_PSDCHH,1}$ is a target receive power of the PSDCH, and this value may be configured by the base station, may be predefined, or may be indicated through higher layer negotiation. $\alpha_{PSDCH,1}$ is a path loss compensation factor, and this value may be configured by the base station, may be predefined, or may be indicated through higher layer negotiation. $PL_{SL}$ is the path loss estimate between the first terminal device and the second terminal device.

Optionally, a transmit power of the PSDCH may alternatively satisfy the following formula:

$$P_{PSDCH}=\min(P_{PSDCH,MAX}, 10 \log_{10}(2^{\mu} \times M_{PSDCH}) + P_{O\_PSDCH,1} + \alpha_{PSDCH,1} \times PL_{SL}, 10 \log_{10}(2^{\mu} \times M_{PSDCH}) + P_{O\_PSDCH,2} + \alpha_{PSDCH,2} \times PL_{DL}) \quad (79)$$

Herein, $P_{O\_PSDCH,1}$ is a target receive power of the PSDCH, and this value may be configured by the base station, may be indicated through higher layer negotiation, or may be predefined. $\alpha_{PSDCH,1}$ is a path loss factor, and this value may be configured by the base station, may be indicated through higher layer negotiation, or may be predefined. $PL_{SL}$ is the path loss estimate between the first terminal device and the second terminal device. $P_{O\_PSDCH,2}$ is a target receive power of the PSDCH, and this value may be configured by the base station. $\alpha_{PSDCH,2}$ is a path loss factor, and this value may be configured by the base station. $PL_{DL}$ is a path loss estimate between the base station and the second terminal device.

Optionally, a transmit power of the PSDCH may alternatively satisfy the following formula:

$$P_{PSDCH} = \min(P_{PSDCH,MAX}, 10 \log_{10}(2^\mu \times M_{PSDCH}) + P_{O\_PSDCH,1} + \alpha_{PSDCH,1} \times PL_{SL} + f_{PSDCH}) \quad (80)$$

Herein, $f_{PSDCH}$ is an adjustment parameter, and may be indicated by the base station through DCI, or may be indicated by the second terminal device. It may be understood that, in this embodiment, closed-loop power control is used to determine the transmit power of the second signal. For specific descriptions of other parameters in the formula (80), refer to the foregoing embodiment. Details are not described herein again.

Optionally, a transmit power of the PSDCH may alternatively satisfy the following formula:

$$P_{PSDCH} = \min(P_{PSDCH,MAX}, 10 \log_{10}(2^\mu \times M_{PSDCH}) + P_{O\_PSDCH,1} + \alpha_{PSDCH,1} \times PL_{SL}, 10 \log_{10}(2^\mu \times M_{PSDCH}) + P_{O\_PSDCH,2} + \alpha_{PSDCH,2} \times PL_{DL} + f_{PSDCH}) \quad (81)$$

It may be understood that, for specific descriptions of the PSDCH, refer to corresponding descriptions of the PSCCH, the PSDCH, or the PSFCH. Details are not described herein.

In some embodiments of this application, for example, the second signal may alternatively include a physical sidelink channel state information reference signal (sidelink channel state information reference signal, S-CSI-RS). In this case, a transmit power of the PSDCH may satisfy the following formula:

$$P_{S\text{-}CSI\text{-}RS} = \min(P_{S\text{-}CSI\text{-}RS,MAX}, 10 \log_{10}(2^\mu \times M_{S\text{-}CSI\text{-}RS}) + P_{O\_S\text{-}CSI\text{-}RS,1} + \alpha_{S\text{-}CSI\text{-}RS,1} \times PL_{SL}) \quad (82)$$

Herein, $P_{S\text{-}CSI\text{-}RS}$ is the transmit power of the S-CSI-RS. $P_{S\text{-}CSI\text{-}RS,MAX}$ is a maximum transmit power of the S-CSI-RS. $M_{S\text{-}CSI\text{-}RS}$ is bandwidth of the S-CSI-RS. $P_{O\_S\text{-}CSI\text{-}RS,1}$ is a target receive power of the S-CSI-RS, and this value may be configured by the base station, may be predefined, or may be indicated through higher layer negotiation. $\alpha_{S\text{-}CSI\text{-}RS,1}$ is a path loss compensation factor, and this value may be configured by the base station, may be predefined, or may be indicated through higher layer negotiation. $PL_{SL}$ is the path loss estimate between the first terminal device and the second terminal device.

Optionally, a transmit power of the S-CSI-RS may alternatively satisfy the following formula:

$$P_{S\text{-}CSI\text{-}RS} = \min(P_{S\text{-}CSI\text{-}RS,MAX}, 10 \log_{10}(2^\mu \times M_{S\text{-}CSI\text{-}RS}) + P_{O\_S\text{-}CSI\text{-}RS,1} + \alpha_{S\text{-}CSI\text{-}RS,1} \times PL_{SL}, 10 \log_{10}(2^\mu \times M_{S\text{-}CSI\text{-}RS}) + P_{O\_S\text{-}CSI\text{-}RS,2} + \alpha_{S\text{-}CSI\text{-}RS,2} \times PL_{DL}) \quad (83)$$

Herein, $P_{O\_S\text{-}CSI\text{-}RS,1}$ is a target receive power of the S-CSI-RS, and this value may be configured by the base station, may be indicated through higher layer negotiation, or may be predefined. $\alpha_{S\text{-}CSI\text{-}RS,1}$ is a path loss factor, and this value may be configured by the base station, may be indicated through higher layer negotiation, or may be predefined. $PL_{SL}$ is the path loss estimate between the first terminal device and the second terminal device. $P_{O\_S\text{-}CSI\text{-}RS,2}$ is a target receive power of the S-CSI-RS, and this value may be configured by the base station. $\alpha_{S\text{-}CSI\text{-}RS,2}$ is a path loss factor, and this value may be configured by the base station. $PL_{DL}$ is a path loss estimate between the base station and the second terminal device.

Optionally, a transmit power of the S-CSI-RS may alternatively satisfy the following formula:

$$P_{S\text{-}CSI\text{-}RS} = \min(P_{S\text{-}CSI\text{-}RS,MAX}, 10 \log_{10}(2^\mu \times M_{S\text{-}CSI\text{-}RS}) + P_{O\_S\text{-}CSI\text{-}RS,1} + \alpha_{S\text{-}CSI\text{-}RS,1} \times PL_{SL} + f_{S\text{-}CSI\text{-}RS}) \quad (84)$$

Herein, $f_{S\text{-}CSI\text{-}RS}$ is an adjustment parameter, and may be indicated by the base station through DCI, or may be indicated by the second terminal device. It may be understood that, in this embodiment, closed-loop power control is used to determine the transmit power of the second signal. For specific descriptions of other parameters in the formula (76), refer to the foregoing embodiment. Details are not described herein again.

Optionally, a transmit power of the S-CSI-RS may alternatively satisfy the following formula:

$$P_{S\text{-}CSI\text{-}RS} = \min(P_{S\text{-}CSI\text{-}RS,MAX}, 10 \log_{10}(2^\mu \times M_{S\text{-}CSI\text{-}RS}) + P_{O\_S\text{-}CSI\text{-}RS,1} + \alpha_{S\text{-}CSI\text{-}RS,1} \times PL_{SL}, 10 \log_{10}(2^\mu \times M_{S\text{-}CSI\text{-}RS}) + P_{O\_S\text{-}CSI\text{-}RS,2} + \alpha_{S\text{-}CSI\text{-}RS,2} \times PL_{DL} + f_{S\text{-}CSI\text{-}RS}) \quad (85)$$

It may be understood that, for specific descriptions of the S-CSI-RS, refer to corresponding descriptions of the PSCCH, the PSDCH, or the PSFCH. Details are not described herein.

It may be understood that the second signal shown above is merely an example. In specific implementation, another signal may be alternatively included. Details are not described herein.

After determining the transmit power of the second signal based on the transmit power of each of the foregoing signals, the second terminal device may send the second signal to the first terminal device.

It should be noted that a unit of a formula in the embodiments shown in this application is not described in detail. It may be understood that a unit of a transmit power of each signal or channel in the foregoing embodiments is dBm.

It may be understood that the power control method provided in this embodiment of this application is described above by using an example in which the first signal is the S-SSB. To be specific, in the power control method shown above, how the first terminal device sends the indication information and the first signal to the second terminal device is described by using an example in which the first signal includes the S-SSB, and how the second terminal device sends the second signal to the first terminal device is described by using an example in which the second signal includes the PSSCH, the PSCCH, the PSFCH, the PSDCH, and the S-CSI-RS. However, in specific implementation, the first signal may alternatively include another signal.

For example, the first signal may alternatively include a PSSCH. When the first signal includes the PSSCH, the indication information may include a DMRS sequence of the PSSCH. To be specific, the first value may be indicated by using the DMRS sequence of the PSSCH. Therefore, after receiving the PSSCH, the second terminal device determines the path loss estimate between the first terminal device and the second terminal device based on a transmit power and a receive power of the PSSCH. Then, the second terminal device may determine the transmit power of the second signal based on the path loss estimate between the first terminal device and the second terminal device. For a formula or a condition that the transmit power of the second signal satisfies, refer to the foregoing embodiment. Details are not described herein again.

For example, the first signal may alternatively include a PSCCH. When the first signal includes the PSCCH, the indication information may include a DMRS sequence of the PSCCH. To be specific, the first value may be indicated by using the DMRS sequence of the PSCCH. Therefore, after receiving the PSCCH, the second terminal device determines the path loss estimate between the first terminal device and the second terminal device based on a transmit power and a receive power of the PSCCH. Then, the second terminal device may determine the transmit power of the second signal based on the path loss estimate between the first terminal device and the second terminal device. For a formula or a condition that the transmit power of the second signal satisfies, refer to the foregoing embodiment. Details are not described herein again.

For example, the first signal may alternatively include a PSFCH. When the first signal includes the PSFCH, the indication information may include a DMRS sequence of the PSFCH. To be specific, the first value may be indicated by using the DMRS sequence of the PSFCH. Therefore, after receiving the PSFCH, the second terminal device determines the path loss estimate between the first terminal device and the second terminal device based on a transmit power and a receive power of the PSFCH. Then, the second terminal device may determine the transmit power of the second signal based on the path loss estimate between the first terminal device and the second terminal device. For a formula or a condition that the transmit power of the second signal satisfies, refer to the foregoing embodiment. Details are not described herein again.

For example, the first signal may alternatively include a C-SCI-RS. The S-CSI-RS is a reference signal, and cannot carry indication information like another channel. Therefore, a sequence used by the S-CSI-RS may be used for indication. For example, the S-CSI-RS has four optional sequences, and each sequence may indicate one transmit power. To be specific, the four optional sequences of the S-CSI-RS may be in a one-to-one correspondence with the K (that is, four) optional power values. Alternatively, the first terminal device may indicate a transmit power of the S-CSI-RS by using higher layer signaling (for example, RRC signaling or MAC CE signaling). However, because a latency during each time of transmission of the higher layer signaling is relatively high, the transmit power of the S-CSI-RS may not be dynamic in this case, but be semi-static.

It may be understood that all the foregoing embodiments are shown in a unicast case, that is, a case in which one first terminal device sends a first signal to one second terminal device. However, in specific implementation, there may be a plurality of terminal devices that send first signals to the second terminal device. In other words, terminal devices in a terminal device set send first signals to the second terminal device. In this case, for example, the second terminal device may determine a path loss estimate between each terminal device in the terminal device set and the second terminal device, to obtain a path loss estimate set. Then, the second terminal device may determine a largest path loss estimate from the path loss estimate set, so as to determine the transmit power of the second signal based on the largest path loss estimate.

The terminal device set may be understood as terminal devices in a multicast set. For example, the terminal device set may be understood as a set of terminal devices that each establish a connection to the second terminal device. In this embodiment, because the transmit power of the second signal is determined based on the largest path loss estimate, it can be effectively ensured that each terminal device in the terminal device set can receive the second signal, so that signal transmission reliability is ensured.

Optionally, the terminal device set may be alternatively understood as a set of terminal devices that are in a multicast set and whose distances from the second terminal device are within a reference range. For example, the terminal device set may be understood as a set of terminal devices that each establish a connection to the second terminal device, and a distance between a terminal device in the terminal device set and the second terminal device is within the reference range. In this embodiment, a case in which interference to another terminal device is caused when the second signal is transmitted based on a very high transmit power because a terminal device in the multicast set is far away from the second terminal device can be avoided. In other words, in this embodiment, reliability of signal transmission of the terminal device within the reference range can be ensured.

It may be understood that, in this embodiment, the reference range may be configured by the base station, may be predefined, or may be determined by the higher layer. A specific range included in the reference range is not limited in this embodiment of this application.

It may be understood that, for specific implementations about how the terminal device in the terminal device set sends the first signal to the second terminal device and how the second terminal device sends the second signal to the terminal device in the terminal device set, refer to the foregoing embodiments. Details are not described herein.

The foregoing describes the power control method provided in the embodiments of this application. The following describes in detail a power control apparatus in the embodiments of this application. The apparatus may be configured to perform the method described in the embodiments of this application. The apparatus may be a terminal device (for example, a first terminal device or a second terminal device), a component that implements the foregoing functions in the terminal device, or a chip. The following uses the terminal device as an example to describe the power control apparatus.

Figure 6:
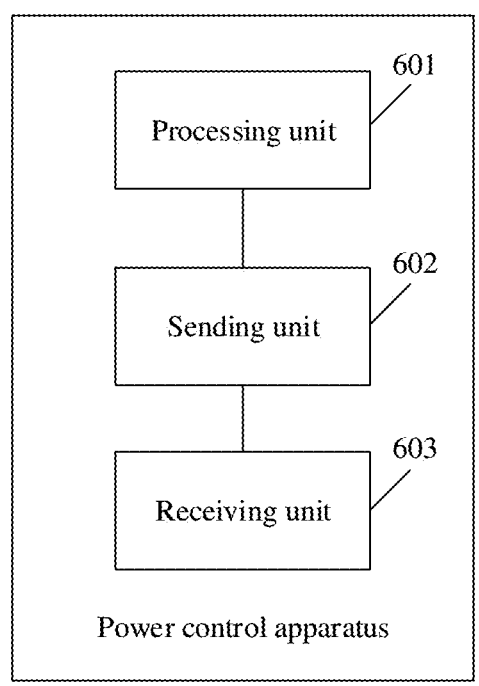
FIG. 6 is a schematic structural diagram of a power control apparatus according to an embodiment of this application.

FIG. 6 is a schematic structural diagram of a power control apparatus according to an embodiment of this application. Optionally, the power control apparatus may be used as a first terminal device, and the power control apparatus may be configured to perform the method described in the embodiments of this application. As shown in FIG. 6, the power control apparatus includes:

a processing unit 601, configured to determine a transmit power of a first signal based on a first value, where the first value is a value in a reference value set, the reference value set includes at least two power values, the first value does not exceed a first power, and the first power is determined based on a maximum transmit power of the first signal; and a sending unit 602, configured to send indication information to a second terminal device, where the indication information is used to indicate or includes the first value, and the sending unit is further configured to send the first signal to the second terminal device based on the transmit power of the first signal.

In this embodiment of this application, the first terminal device indicates the first value to the second terminal device, so that the second terminal device can obtain a path loss estimate between the first terminal device and the second terminal device based on the first value. Therefore, the second terminal device can effectively determine a transmit power of a signal during sidelink transmission. This improves reliability of signal transmission between terminal devices.

Optionally, the first value does not exceed a second power, and the second power is determined based on a path loss estimate between a network device and the first terminal device.

Optionally, the reference value set is configured by the network device; the reference value set is predefined; or the reference value set is determined by a higher layer of the first terminal device.

Optionally, the first value is used to indicate a transmit power on a first orthogonal frequency division multiplexing OFDM symbol on which the first signal is located; the first value is used to indicate a transmit power on a first resource element RE of a first OFDM symbol on which the first signal is located; or the first value is used to indicate a transmit power on a first resource block RB of a first OFDM symbol on which the first signal is located.

Optionally, the transmit power of the first signal is a power value corresponding to the first value; or the transmit power of the first signal is a sum of a power value corresponding to the first value and a power offset value.

Optionally, the power offset value is predefined, or the power offset value is determined by the first terminal device.

Optionally, the first signal includes a sidelink synchronization signal block SSSB, the SSSB includes a physical sidelink broadcast channel PSBCH, a primary sidelink synchronization signal PSSS, and a secondary sidelink synchronization signal SSSS, and the indication information includes at least one of the following: load information of the PSBCH; a demodulation reference signal DMRS sequence of the PSBCH; and a power difference between at least two of the PSBCH, the PSSS, and the SSSS.

Optionally, when the indication information includes the power difference between the at least two of the PSBCH, the PSSS, and the SSSS, there is a mapping relationship between the first value and the power difference, where the mapping relationship is configured by the network device; the mapping relationship is predefined; or the mapping relationship is determined by the higher layer of the first terminal device.

Optionally, the first signal includes a physical sidelink shared channel PSSCH, and the indication information is carried in the PSSCH; the first signal includes a physical sidelink control channel PSCCH, and the indication information is carried in the PSCCH; or the first signal includes a physical sidelink feedback channel PSFCH, and the indication information is carried in the PSFCH.

Optionally, the first signal includes a reference signal, the indication information includes a sequence of the reference signal, and the reference signal is used to determine channel state information between the first terminal device and the second terminal device.

Optionally, as shown in FIG. 6, the power control apparatus further includes:

a receiving unit 603, configured to receive a second signal from the second terminal device, where a transmit power of the second signal is determined based on a path loss estimate between the first terminal device and the second terminal device, and the path loss estimate between the first terminal device and the second terminal device is determined based on the transmit power of the first signal and a receive power of the first signal.

Optionally, the sending unit 602 and the receiving unit 603 may be integrated into one component. For example, the sending unit 602 and the receiving unit 603 may be a transceiver. Alternatively, the sending unit 602 and the receiving unit 603 may be separated into different components. A specific implementation of the sending unit 602 and the receiving unit 603 is not limited in this application.

Optionally, the transmit power of the second signal satisfies the following formula:

$$P_2 = \min\{P_{CMAX\_2}, y(M) + P_{O\_1} + \alpha_1 \cdot PL_{SL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

Optionally, the transmit power of the second signal is determined based on the path loss estimate between the first terminal device and the second terminal device and a path loss estimate between the network device and the second terminal device.

Optionally, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL}\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

Optionally, the transmit power of the second signal satisfies the following formula:

$$P_2 = \min\{P_{CMAX\_2}, y(M) + P_{O\_1} + \alpha_1 \cdot PL_{SL}, y(M) + P_{O\_2} + \alpha_2 \cdot PL_{DL} + f\}.$$

Herein, $P_{CMAX\_2}$ is a maximum transmit power of the second signal, $y(M)$ is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

It should be understood that when the power control apparatus is a terminal device or a component that implements the foregoing functions in the terminal device, the processing unit 601 may be one or more processors, the sending unit 602 may be a transmitter, and the receiving unit 603 may be a receiver. Alternatively, the sending unit 602 and the receiving unit 603 are integrated into one component, for example, a transceiver. When the power control apparatus is a chip, the processing unit 601 may be one or more processors, the sending unit 602 may be an output interface, and the receiving unit 603 may be an input interface. Alternatively, the sending unit 602 and the receiving unit 603 are integrated into one unit, for example, an input/output interface.

Figure 7:
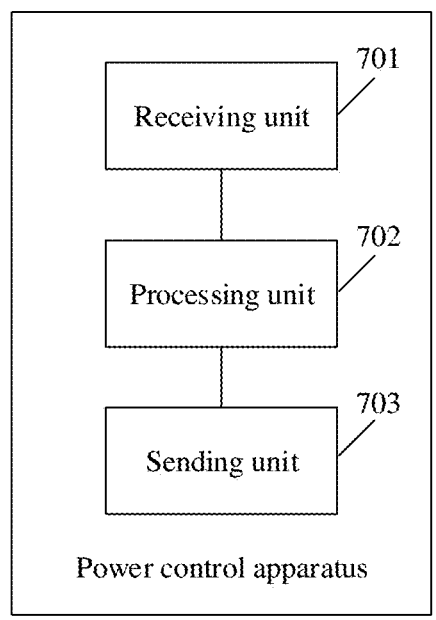
FIG. 7 is a schematic structural diagram of another power control apparatus according to an embodiment of this application.

FIG. 7 is a schematic structural diagram of another power control apparatus according to an embodiment of this application. Optionally, the power control apparatus may be used as a second terminal device, and the power control apparatus may be configured to perform the method described in the embodiments of this application. As shown in FIG. 7, the power control apparatus includes:

a receiving unit 701, configured to receive a first signal and indication information from a first terminal device, where the indication information is used to indicate or includes a first value, the first value is a value in a reference value set, the reference value set includes at least two power values, the first value does not exceed a first power, and the first power is determined based on a maximum transmit power of the first signal; and a processing unit 702, configured to determine a path loss estimate between the first terminal device and the second terminal device based on the indication information and a receive power of the first signal.

Optionally, the first value does not exceed a second power, and the second power is determined based on a path loss estimate between a network device and the first terminal device.

Optionally, the processing unit 702 is further configured to determine a transmit power of a second signal based on the path loss estimate between the first terminal device and the second terminal device.

As shown in FIG. 7, the power control apparatus further includes:

a sending unit 703, configured to send the second signal to the first terminal device based on the transmit power of the second signal.

Optionally, the transmit power of the second signal satisfies the following formula:

$$P_2=\min\{P_{CMAX\_2}, y(M)+P_{O\_1}+\alpha_1 \cdot PL_{SL}+f\}.$$

Herein, $P_{CMAX\_2}$ is a maximum transmit power of the second signal, y(M) is a function of bandwidth of the second signal, $PL_{SL}$ is the path loss estimate between the first terminal device and the second terminal device, $P_{O\_1}$ is a target power, $\alpha_1$ is a path loss compensation factor, and f is an adjustment parameter.

Optionally, the processing unit 702 is specifically configured to determine the transmit power of the second signal based on the path loss estimate between the first terminal device and the second terminal device and a path loss estimate between the network device and the second terminal device.

Optionally, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{DL}\}.$$

Herein, $P_{CMAX\_2}$ is a maximum transmit power of the second signal, y(M) is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, and $\alpha_1$ and $\alpha_2$ are path loss compensation factors.

Optionally, the transmit power of the second signal satisfies the following formula:

$$P_2=\min\{P_{CMAX\_2}, y(M)+P_{O\_1}+\alpha_1 \cdot PL_{SL}, y(M)+P_{O\_2}+\alpha_2 \cdot PL_{DL}+f\}.$$

Herein, $P_{CMAX\_2}$ is a maximum transmit power of the second signal, y(M) is a function of bandwidth of the second signal, $PL_{SL}$ is the path loss estimate between the first terminal device and the second terminal device, $PL_{DL}$ is the path loss estimate between the network device and the second terminal device, $P_{O\_1}$ and $P_{O\_2}$ are target powers, $\alpha_1$ and $\alpha_2$ are path loss compensation factors, and f is an adjustment parameter.

Optionally, the first terminal device includes a terminal device in a terminal device set, where a path loss estimate between the terminal device and the second terminal device is the highest.

Optionally, the terminal device set is a set of terminal devices that each establish a connection to the second terminal device, or the terminal device set is a set of terminal devices that each establish a connection to the second terminal device and whose distances from the second terminal device are within a reference range.

It should be understood that when the power control apparatus is a terminal device or a component that implements the foregoing functions in the terminal device, the processing unit 702 may be one or more processors, the sending unit 703 may be a transmitter, and the receiving unit 701 may be a receiver. Alternatively, the sending unit 703 and the receiving unit 701 are integrated into one component, for example, a transceiver. When the power control apparatus is a chip, the processing unit 702 may be one or more processors, the sending unit 703 may be an output interface, and the receiving unit 701 may be an input interface. Alternatively, the sending unit 703 and the receiving unit 701 are integrated into one unit, for example, an input/output interface.

It may be understood that, for specific implementations of the power control apparatuses shown in FIG. 6 and FIG. 7, refer to the foregoing embodiments. Details are not described herein.

Figure 8:
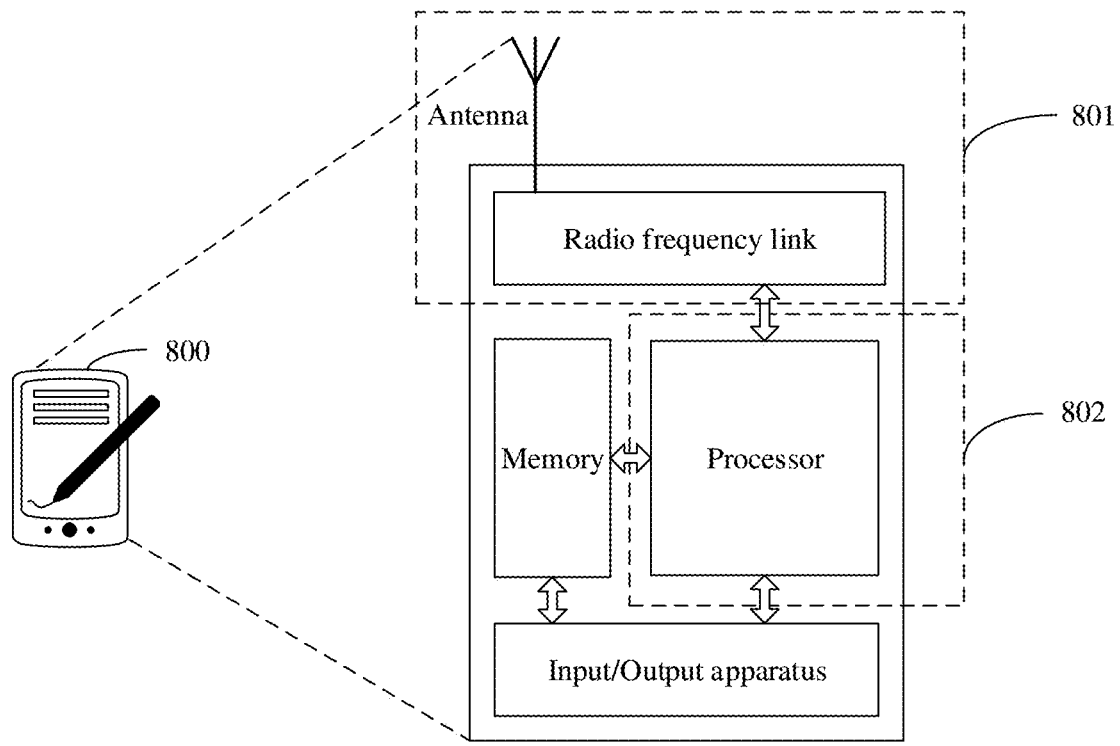
FIG. 8 is a schematic structural diagram of a terminal device according to an embodiment of this application.

FIG. 8 is a schematic structural diagram of a terminal device 80o according to an embodiment of this application. The terminal device may perform the method shown in FIG. 4, or the terminal device may perform operations of the power control apparatuses shown in FIG. 6 and FIG. 7.

For ease of description, FIG. 8 shows only main components of the terminal device. As shown in FIG. 8, the terminal device 80o includes a processor, a memory, a radio frequency link, an antenna, and an input/output apparatus. The processor is mainly configured to: process a communications protocol and communication data, control the entire terminal device, execute a software program, and process data of the software program, for example, configured to support the terminal device in performing the procedure described in FIG. 4. The memory is mainly configured to store the software program and data. The radio frequency link is mainly configured to: perform conversion between a baseband signal and a radio frequency signal, and process the radio frequency signal. The antenna is mainly configured to receive/send a radio frequency signal in a form of an electromagnetic wave. The terminal device 80o may further include the input/output apparatus, such as a touchscreen, a display, or a keyboard, and is mainly configured to: receive data entered by a user, and output data to the user. It should be noted that some types of terminal devices may have no input/output apparatus.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to the radio frequency link. After performing radio frequency processing on the baseband signal, the radio frequency link sends a radio frequency signal to the outside through the antenna in an electromagnetic wave form. When data is sent to the terminal device, the radio frequency link receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit (central processing unit, CPU). The baseband processor is mainly configured to process a communications protocol and communications data. The CPU is mainly configured to: control the entire terminal device, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random access memory, RAM); or the memory may include a non-volatile memory (non-volatile memory), for example, a flash memory (flash memory), a hard disk drive (hard disk drive, HDD), or a solid-state drive (solid-state drive, SSD); or the memory may include a combination of the foregoing types of memories.

For example, in this embodiment of this application, the antenna that has a transceiver function and the radio frequency link may be considered as a transceiver unit 801 of the terminal device 800, and the processor having a processing function may be considered as a processing unit 802 of the terminal device 800.

As shown in FIG. 8, the terminal device 800 may include the transceiver unit 801 and the processing unit 802. The transceiver unit may also be referred to as a transceiver, a transceiver machine, a transceiver apparatus, or the like. Optionally, a component that is in the transceiver unit 801 and that is configured to implement a reception function may be considered as a receiving unit, and a component that is in the transceiver unit 801 and that is configured to implement a transmission function may be considered as a sending unit. In other words, the transceiver unit 801 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

In some embodiments, the transceiver unit 801 and the processing unit 802 may be integrated into one component, or may be separated as different components. In addition, the processor and the memory may be integrated into one component, or may be separated as different components. For example, in an embodiment, the transceiver unit 801 may be configured to perform the method in step 402 and step 403 shown in FIG. 4. For another example, in an embodiment, the transceiver unit 801 may be configured to perform the method in step 406 shown in FIG. 4.

For another example, in an embodiment, the processing unit 802 may be configured to control the transceiver unit 801 to perform the method in step 402 and step 403 shown in FIG. 4. For another example, in an embodiment, the processing unit 802 may be configured to control the transceiver unit 801 to perform the method in step 406 shown in FIG. 4.

For another example, in an embodiment, the processing unit 802 may be further configured to perform the method in step 401 shown in FIG. 4. For another example, in an embodiment, the processing unit 802 may be configured to perform the method in step 404 and step 405 shown in FIG. 4.

For another example, in an embodiment, the transceiver unit 801 may be configured to perform the method performed by the sending unit 602 and the receiving unit 603. For another example, in an embodiment, the processing unit 802 may be configured to perform the method performed by the processing unit 601.

For another example, in an embodiment, the transceiver unit 801 may be configured to perform the method performed by the receiving unit 701 and the sending unit 703. For another example, in an embodiment, the processing unit 802 may be configured to perform the method performed by the processing unit 702.

It may be understood that for an implementation of the terminal device in this embodiment of this application, refer to the foregoing embodiments. Details are not described herein again.

An embodiment of this application further provides a computer-readable storage medium. All or some of the processes in the foregoing method embodiments may be implemented by a computer program instructing related hardware. The program may be stored in the foregoing computer storage medium. When the program is executed, the processes in the foregoing method embodiments may be performed. The computer-readable storage medium may be an internal storage unit of the power control apparatus (including the first terminal device and/or the second terminal device) in any one of the foregoing embodiments, for example, a hard disk or memory of the power control apparatus. The computer-readable storage medium may alternatively be an external storage device of the power control apparatus, for example, a pluggable hard disk, a smart media card (smart media card, SMC), a secure digital (secure digital, SD) card, or a flash card (flash card) disposed on the power control apparatus. Further, the computer-readable storage medium may alternatively include both an internal storage unit and an external storage device of the power control apparatus. The computer-readable storage medium is configured to store the computer program and other programs and data that are required by the power control apparatus. The computer-readable storage medium may be further configured to temporarily store data that has been output or is to be output.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instruction may be stored in a computer-readable storage medium, or may be transmitted through the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Sequence adjustment, combination, or deletion may be performed on the steps of the method in the embodiments of this application based on an actual requirement.

Modules in the apparatus in the embodiments of this application may be combined, divided, or deleted based on an actual requirement.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of the embodiments of this application.

What is claimed is:

1. A power control method, comprising:
   determining, by a second terminal device, a path loss estimate between a first terminal device and the second terminal device;
   determining, by the second terminal device, a transmit power of a signal based on the path loss estimate between the first terminal device and the second terminal device and further based on a path loss estimate between a network device and the second terminal device; and
   sending, by the second terminal device, the signal to the first terminal device based on the transmit power of the signal;
   wherein the signal is a physical sidelink shared channel (PSSCH), and wherein the transmit power of the PSSCH is:

$$P_{PSSCH}=\min[P_{PSSCH,MAX}, 10\log_{10}(2^{\mu} \times M_{PSSCH}) + P_{O\_PSSCH,1}+\alpha_{PSSCH,1} \times PL_{SL}, 10\log_{10}(2^{82} \times M_{PSSCH}) + P_{O\_PSSCH,2}+\alpha_{PSSCH,2} \times PL_{DL}]$$

wherein $P_{PSSCH,MAX}$ is a maximum transmit power of the PSSCH, $\mu$ is a numerology set, $M_{PSSCH}$ is bandwidth of the PSSCH, $P_{O\_PSSCH,1}$ is a target receive power of the PSSCH, $\alpha_{PSSCH,1}$ is a path loss compensation factor, $PL_{SL}$ is the path loss estimate between the first terminal device and the second terminal device, $P_{O\_PSSCH,2}$ is a target receive power of the PSSCH, $\alpha_{PSSCH,2}$ is a path loss factor, and $PL_{DL}$ is a path loss estimate between a base station and the second terminal device.

2. The method according to claim 1, wherein $P_{O\_PSSCH,1}$, $P_{O\_PSSCHH,2}$, and $\alpha_{PSSCH,1}$ are configured by the base station.

3. The method according to claim 1, wherein the transmit power of the PSSCH is further determined according to an adjustment parameter $f_{PSSCH}$.

4. The method according to claim 3, wherein the adjustment parameter is indicated by the base station.

5. The method according to claim 3, wherein the base station indicates the adjustment parameter through downlink control information (DCI).

6. The method according to claim 3, wherein the adjustment parameter is indicated the second terminal device.

7. The method according to claim 1, wherein the path loss estimate between the first terminal device and the second terminal device is generated according to indication information received by the second terminal device from the first terminal device.

8. An apparatus, comprising:
   a processor; and
   a non-transitory computer readable memory storing a program for execution by the processor, the program including instructions for:
      determining a path loss estimate between a terminal device and the apparatus;
      determining a transmit power of a signal based on the path loss estimate between the terminal device and the apparatus and further based on a path loss estimate between a network device and the apparatus; and
      sending, by the apparatus, the signal to the terminal device based on the transmit power of the signal;
   wherein the signal is a physical sidelink shared channel (PSSCH), wherein the transmit power of the PSSCH is:

$$P_{PSSCH}=\min[P_{PSSCH,MAX}, 10\log_{10}(2^{\mu} \times M_{PSSCH}) + P_{O\_PSSCH,1}+\alpha_{PSSCH,1} \times PL_{SL}, 10\log_{10}(2^{\mu} \times M_{PSSCH}) + P_{O\_PSSCH,2}+\alpha_{PSSCH,2} \times PL_{DL}]$$

wherein $P_{PSSCH,MAX}$ is a maximum transmit power of the PSSCH, $\mu$ is a numerology set, $M_{PSSCH}$ is bandwidth of the PSSCH, $P_{O\_PSSCH,1}$ is a target receive power of the PSSCH, $\alpha_{PSSCH,1}$ is a path loss compensation factor, $PL_{SL}$ is the path loss estimate between the terminal device and the apparatus, $P_{O\_PSSCH,2}$ is a target receive power of the PSSCH, $\alpha_{PSSCH,2}$ is a path loss factor, and $PL_{DL}$ is a path loss estimate between a base station and the apparatus.

9. The apparatus according to claim 8, wherein $P_{O\_PSSCH,1}$, $P_{O\_PSCH,2}$, $\alpha_{PSSCH,1}$ and $\alpha_{PSSCH,2}$ are configured by the base station.

10. The apparatus according to claim 8, wherein the transmit power of the PSSCH is further determined according to an adjustment parameter $f_{PSSCH}$.

11. The apparatus according to claim 10, wherein the adjustment parameter is indicated by the base station.

12. The apparatus according to claim 10, wherein the base station indicates the adjustment parameter through downlink control information (DCI).

13. The apparatus according to claim 10, wherein the adjustment parameter is indicated the apparatus.

14. The apparatus according to claim 8, wherein the path loss estimate between the terminal device and the apparatus is generated according to indication information received by the apparatus from the terminal device.

15. A non-transitory computer readable storage medium having a program stored thereon, the program including instructions, that, when executed by a computer of a communications device, enable the communications device to perform:
   determining, by the communications device, a path loss estimate between a terminal device and the communications device;
   determining, by the communications device, a transmit power of a signal based on the path loss estimate between the terminal device and the communications device and further based on a path loss estimate between a network device and the communications device; and
   sending, by the communications device, the signal to the terminal device based on the transmit power of the signal;
   wherein the signal is a physical sidelink shared channel (PSSCH), the transmit power of the PSSCH is:

$$P_{PSSCH}=\min[P_{PSSCH,MAX}, 10\log_{10}(2^{\mu} \times M_{PSSCH}) + P_{O\_PSSCH,1}+\alpha_{PSSCH,1} \times PL_{SL}, 10\log_{10}(2^{\mu} \times M_{PSSCH}) + P_{O\_PSSCH,2}+\alpha_{PSSCH,2} \times PL_{DL}]$$

wherein $P_{PSSCH},MAX$ is a maximum transmit power of the PSSCH, $\mu$ is a numerology set, $M_{PSSCH}$ is bandwidth of the PSSCH, $P_{O\_PSSCH,1}$ is a target receive power of the PSSCH, $\alpha_{PSSCH,1}$ is a path loss compensation factor, $PL_{SL}$ is the path loss estimate between the terminal device and the communications device, $P_{O\_PSSCH,2}$ is a target receive power of the PSSCH, $\alpha_{PSSCH,2}$ is a path loss factor, and $PL_{DL}$ is a path loss estimate between a base station and the communications device.

16. The non-transitory computer readable storage medium according to claim 15, wherein $P_{O\_PSSCH,1}$, $P_{O\_PSSCH,2}$, $\alpha_{PSSCH,1}$ and a $\alpha_{PSSCH,2}$ are configured by the base station.

17. The A non-transitory computer readable storage medium according to claim 15, wherein the transmit power of the PSSCH is further determined according to an adjustment parameter $f_{PSSCH}$.

18. The A non-transitory computer readable storage medium according to claim 17, wherein the adjustment parameter is indicated by the base station through downlink control information (DCI).

19. The A non-transitory computer readable storage medium according to claim 17, wherein the adjustment parameter is indicated the communications device.

20. The A non-transitory computer readable storage medium according to claim 15, wherein the path loss estimate between the terminal device and the apparatus is generated according to indication information received by the communications device from the terminal device.

* * * * *

UNITED STATES PATENT AND TRADEMARK OFFICE
CERTIFICATE OF CORRECTION

PATENT NO. : 11,856,393 B2
APPLICATION NO. : 17/421869
DATED : December 26, 2023
INVENTOR(S) : Xue et al.

Page 1 of 1

It is certified that error appears in the above-identified patent and that said Letters Patent is hereby corrected as shown below:

In the Claims

In Column 47, in Claim 1, Line 39, delete "$(2^{82}\times$" and insert -- $(2^{\mu}\times$ --.

In Column 47, in Claim 2, Line 51, delete "$P_{O\_PSSCHH,2}$," and insert -- $P_{O\_PSSCH,2}$, --.

In Column 48, in Claim 8, Line 20, delete "$P_{PSSCH},MAX$" and insert -- $P_{PSSCH,MAX}$ --.

In Column 48, in Claim 9, Line 30, delete "$P_{O\_PSCH,2}$," and insert -- $P_{O\_PSSCH,2}$, --.

In Column 49, in Claim 15, Line 1, delete "$P_{PSSCH},MAX$" and insert -- $P_{PSSCH,MAX}$ --.

In Column 49, in Claim 16, Line 13, delete "and a" and insert -- and --.

In Column 49, in Claim 17, Line 14, delete "The A" and insert -- The --.

In Column 49, in Claim 18, Line 18, delete "The A" and insert -- The --.

In Column 49, in Claim 19, Line 22, delete "The A" and insert -- The --.

In Column 49, in Claim 20, Line 25, delete "The A" and insert -- The --.

Signed and Sealed this
Third Day of September, 2024

Katherine Kelly Vidal
*Director of the United States Patent and Trademark Office*